(12) United States Patent
Mori

(10) Patent No.: US 10,908,032 B2
(45) Date of Patent: Feb. 2, 2021

(54) CONTACT DETECTION DEVICE INCLUDING FLOW SENSOR

(71) Applicant: MIE ROBOT EXTERIOR TECHNOLOGY LABORATORY CO., LTD., Yokkaichi-shi (JP)

(72) Inventor: Daisuke Mori, Yokkaichi (JP)

(73) Assignee: MIE ROBOT EXTERIOR TECHNOLOGY LABORATORY CO., LTD., Yokkaichi (JP)

( * ) Notice: Subject to any disclaimer, the term of this patent is extended or adjusted under 35 U.S.C. 154(b) by 112 days.

(21) Appl. No.: 16/099,938

(22) PCT Filed: Feb. 8, 2017

(86) PCT No.: PCT/JP2017/004516
§ 371 (c)(1),
(2) Date: Nov. 8, 2018

(87) PCT Pub. No.: WO2017/195418
PCT Pub. Date: Nov. 16, 2017

(65) Prior Publication Data
US 2019/0154522 A1    May 23, 2019

(30) Foreign Application Priority Data

May 12, 2016    (JP) .................................. 2016-095763

(51) Int. Cl.
*G01L 1/02* (2006.01)
*B29C 44/02* (2006.01)
(Continued)

(52) U.S. Cl.
CPC .................. *G01L 1/02* (2013.01); *B05D 7/02* (2013.01); *B29C 39/02* (2013.01); *B29C 44/02* (2013.01);
(Continued)

(58) Field of Classification Search
CPC ............. G01L 19/0023; G01L 19/0038; G01L 19/143; G01L 19/147; G01F 1/386;
(Continued)

(56) References Cited

U.S. PATENT DOCUMENTS 6,863,849 B2 * 3/2005 Nohara ............... B29C 44/1233
264/45.4
6,941,182 B2   9/2005 Selim et al.
(Continued)

FOREIGN PATENT DOCUMENTS

CN     104428739 A    3/2015
JP     2005-125736 A    5/2005
(Continued)

OTHER PUBLICATIONS

Communication dated Oct. 24, 2019, from the European Patent Office in application No. 17795779.2.
(Continued)

*Primary Examiner* — Tran M. Tran
(74) *Attorney, Agent, or Firm* — Sughrue Mion, PLLC; Richard C. Turner

(57) ABSTRACT

A contact detection device detects pressure over a wide range, be applied to even a three-dimensional structure, and detect predetermined contact pressure or more. A volume space 4 is between a base 1 that is composed of a foamed synthetic resin 10 with a particular shape and the foamed synthetic resin body 10 that is composed of the foamed synthetic resin with a particular shape and covers the foamed synthetic resin body 10. The volume space 4 is on either or both of the base 1 and the foamed synthetic resin 10. Air in the volume space 4 is prevented from leaking trough the base 1 and the foamed synthetic resin 10 to open air. At least one flow sensor 70 detects flow rate (liter/second) of air that flows from the volume space 4 to open air.

6 Claims, 17 Drawing Sheets

(51) Int. Cl.
*B29C 39/02* (2006.01)
*B05D 7/02* (2006.01)
*B29C 44/42* (2006.01)
*B29L 31/00* (2006.01)

(52) U.S. Cl.
CPC ......... *B29C 44/42* (2013.01); *B29L 2031/752* (2013.01)

(58) Field of Classification Search
CPC ......... G01F 11/12; G01F 11/125; F01F 11/14; B60N 2/565; B60N 2/5657
See application file for complete search history.

(56) References Cited

U.S. PATENT DOCUMENTS

| | | | | |
|---|---|---|---|---|
| 7,077,986 | B2* | 7/2006 | Kurihara | B29C 43/003 264/45.5 |
| 7,827,805 | B2* | 11/2010 | Comiskey | B60N 2/5635 62/244 |
| 8,827,372 | B2* | 9/2014 | Yoon | B29C 44/1271 297/452.42 |
| 9,068,871 | B2* | 6/2015 | Yamamoto | G01F 1/684 |
| 9,091,605 | B2* | 7/2015 | Kawashima | G01L 1/02 |
| 9,360,292 | B2* | 6/2016 | Haugan | H05K 5/068 |
| 10,515,770 | B2* | 12/2019 | Gregory | H01H 1/5805 |
| 10,647,230 | B2* | 5/2020 | Fujii | B60N 2/5628 |
| 2002/0026838 | A1* | 3/2002 | Odashima | G01L 5/226 73/862.581 |
| 2012/0193211 | A1 | 8/2012 | Ciesla et al. | |
| 2014/0260678 | A1 | 9/2014 | Jentoft et al. | |

FOREIGN PATENT DOCUMENTS

| | | |
|---|---|---|
| JP | 2010-236220 A | 10/2010 |
| JP | 2014-156523 A | 8/2014 |
| JP | 2014-188391 A | 10/2014 |
| JP | 5704712 B2 | 4/2015 |
| KR | 1020100022748 A | 3/2010 |
| KR | 1020130083303 A | 7/2013 |
| WO | 2013173624 A2 | 11/2013 |

OTHER PUBLICATIONS

International Search Report for PCT/JP2017/004516 dated Apr. 25, 2017 [PCT/ISA/210].
Communication dated Feb. 27, 2020 from the State Intellectual Property Office of the P.R.C. in Application No. 201780029305.7.
Communication dated Oct. 21, 2020 from European Patent office in EP Application No. 17795779.2.

* cited by examiner

31

32

CONTACT DETECTION DEVICE INCLUDING FLOW SENSOR

CROSS REFERENCE TO RELATED APPLICATIONS

This application is a National Stage of International Application No. PCT/JP2017/004516, filed on Feb. 8, 2017, which claims priority from Japanese Patent Application No. 2016-095763, filed on May 12, 2016.

TECHNICAL FIELD

The present invention relates to a contact detection device. The contact detection device has a base with a predetermined shape and a foamed synthetic resin body that is formed by cutting foamed synthetic resin into a predetermined shape. The contact detection device includes a volume space between the base and the foamed synthetic resin body. This volume space is on either or both of the base and the foamed synthetic resin body. The contact detection device detects external force that is applied to a particular surface by using at least one sensor that detects variation in air in the volume space. The sensor is called as a flow sensor or a flow rate sensor. In Particular, the present invention relates to the two-dimensional or three dimensional contact detection device that detects contact on any position. This contact detection device is formed by cutting the foamed synthetic resin into a predetermined shape and has coated inside on the side of the volume space.

BACKGROUND ART

A typical molding method of a foamed synthetic resin molding and the foamed synthetic resin molding has been used foamed polystyrene, which has been formed by foaming polystyrene and hardening the resultant polystyrene with fine bubbles. This foamed polystyrene has been coated on the surface. For example, glue for wood has been applied to the foamed polystyrene and then splay has been applied to the resultant foamed polystyrene after the glue had hardened.

Alternatively, water based glue including pigment has been directly applied to the foamed polystyrene. Alternatively, glue for wood or starch paste that is mixed with Japanese traditional paper 'washi', which had been broken and powdered, has been stuck to the foamed polystyrene. Then, neo color or poster color, which both are water based glue, has been applied to the foamed polystyrene. Alternatively, the foamed polystyrene used as a base has been molded with fiberglass reinforced plastics (FRP).

Any methods has yielded thick coat on the foamed synthetic resin molding. Thus, conventional foamed synthetic resin moldings cannot withstand practical use although they have good appearance.

No foamed synthetic resin molding that is formed by directly cutting the foamed synthetic resin into a particular shape and its molding method have been founded by searching very similar arts. Japanese Unexamined Patent Application Publication No. 2005-125736 discloses the interior equipment that has a foamed layer.

According to the interior equipment with the foamed layer of Japanese Unexamined Patent Application Publication No. 2005-125736, a skin material with a foamed layer is adsorbed to a base, by vacuum absorbing from absorb intake path, which is dispersed in the base, and then is stuck to the base. When the skin material, which is composed of thermoplastic and softened by heating, is stuck to the base, the skin material is shaped by vacuum absorbing. This skin material is shaped along to the mold surface of vacuum absorbing for the skin material. Thus, the interior equipment has a surface shape that is shaped by vacuum absorbing for the skin material. This provides increased quality in the surface. Additionally, limitation of design decreases, flexibility of design increases. The skin material can form into non-similar shape to the base surface.

Thus, the interior equipment with the foamed layer has the skin material with the foamed layer. This skin material is adsorbed to the base by vacuum absorbing from absorb intake path, which is dispersed in the base, and then is stuck to the base. This enhances bond strength between the foamed layer and the skin material. Unfortunately, dealing with thick foamed layer is not described in Japanese Unexamined Patent Application Publication No. 2005-125736. In principle, it is difficult to cut foamed synthetic resin materials into a particular shape to form the foamed synthetic resin.

Japanese Unexamined Patent Application Publication No. 2010-236220 discloses a lamination that has a core composed of foamed synthetic resin, a tatami matt on a first surface of the core, a cushion sheet including function agent on a second surface of the core, and a slip resistant layer that is partially laminated on the surface of the cushion sheet. This provides thin, light weighted, easy installation, and anti slip.

CITATION LIST

Patent Literature

PTL1: Japanese Unexamined Patent Application Publication No. 2005-125736
PTL2: Japanese Unexamined Patent Application Publication No. 2010-236220
PTL3: Japanese Unexamined Patent Application Publication No. 2014-156523
PTL4: Japanese Unexamined Patent Application Publication No. 2014-188391

DISCLOSURE OF THE INVENTION

Technical Problem

Unfortunately, typical foamed synthetic resin moldings have been short of mechanical strength and made a surrounding dirty with coat like dust that has peeled, when used in, for example, a cover of a non-mass production product, an armrest of a special chair, a dashboard of a special vehicle or a remodeled car. Thus, conventional foamed synthetic resin moldings have not been practical use in low-priced. Of course, forming foamed polystyrene, which is used as a base, with FRP molding has increased mechanical strength. Unfortunately, such foamed polystyrene with FRP has had poor elasticity and been expensive.

Japanese Unexamined Patent Application Publication No. 2005-125736 and Japanese Unexamined Patent Application Publication No. 2010-236220 disclose increasing bond strength between the foamed synthetic resin molding and the cushion sheet. The foamed synthetic resin has been used as material of prototype formally. Unfortunately, the technique in Japanese Unexamined Patent Application Publication No. 2005-125736 and Japanese Unexamined Patent Application Publication No. 2010-236220 have not achieved use in small production. In particular, the foamed synthetic resin molding such as foamed polystyrene is brittle. Thus, the foamed synthetic resin molding cannot be formed into a predetermined shape by cutting the surface. Additionally, the foamed synthetic resin molding cannot have flat surface and good appearance.

When the foamed synthetic resin has a hole called as a vent hole, no one expect for experts can efficiently mold the foamed synthetic resin. In this situation, filling the hole is depended on the thickness of rest of the foamed synthetic resin. Filling the vent hole causes the foamed synthetic resin molding to have a subtle different in weight balance. Regulation of the weight balance is needed depending on use application.

Japanese Unexamined Patent Application Publication No. 2014-156523 and Japanese Unexamined Patent Application Publication No. 2014-188391 solve the problem described above, providing the foamed synthetic resin molding that is formed by cutting the foamed synthetic resin, as the base, into a particular shape and thus has high elasticity. This foamed synthetic resin molding has thin coat on the surface, good appearance and is inexpensive. Unfortunately, if Japanese Unexamined Patent Application Publication No. 2014-156523 and Japanese Unexamined Patent Application Publication No. 2014-188391 use a touch sensor, the surface needs to be coated with, e.g., metal electrode or conductive coating. Thus, contact side is limited to conductor.

When a force sensing switch on the market has been used, the force sensing switch at a part under the pressure has operated. Unfortunately, the pressure of a part in which no force sensing switch is buried cannot be detected. Additionally, the force sensing switch cannot form into three-dimensions, as an insulating substrate (sheet) of the force sensing switch is not flexible.

It is an object of the present invention to provide a contact detection device that detects pressure over a wide range, be applied to a two-dimensional plane structure and a three-dimensional structure, and detect predetermined contact pressure or more.

Solution to Problem

A contact detection device according to a first aspect of the present invention includes a base with a particular shape, and a foamed synthetic resin body that covers the base. The foamed synthetic resin body is composed of foamed synthetic resin that forms into a particular shape. The contact detection device includes a volume space in which the air is prevented from leaking trough the base and the foamed synthetic resin body to open air. The volume space is on one of sides or both sides between the foamed synthetic resin body and the foamed synthetic resin body. The contact detection device further includes a reinforced layer to prevent the air in the volume space from leaking to open air. The contact detection device further includes at least one flow sensor that detects air flow that flows from the volume space to open air. In the contact detection device, the output signal of the flow sensor is amplified.

The base with a particular shape may be composed of thermoplastic resin that forms into a particular shape. The thermoplastic resin may be composed of one or more. Two or more thermoplastic resin may be stacked and bonded together. The thermoplastic resin composed of one or more may be solid resin or foamed synthetic resin body. The thermoplastic resin is only required to have a predetermined hardness that permits the volume space to vary in volume.

The foamed synthetic resin body has a particular shape and covers the base. The foamed synthetic resin body is composed of a piece of foamed synthetic resin or a plurality of pieces of foamed synthetic resin that are stacked and bonded together. The foamed synthetic resin body typically covers the foamed synthetic resin body from the outside. The base covers an automatic production apparatus including a self-propelled robot. This base is covered with the foamed synthetic resin body for safety and protection.

The reinforced layer is between the base and the foamed synthetic resin body, and on the base, the foamed synthetic resin body, or both. The reinforced layer prevents the air in the volume space from passing through the reinforced layer. This prevents the air in the volume space from leaking through the base or/and the foamed synthetic resin body to open air. The reinforced layer includes a skin layer that is formed by cooling in an injection molding. The volume space in which the air is prevented from leaking does not necessarily need the state where no air leaks. The volume space in which the air is prevented from leaking means the state where a leakage of the air has substantially no effect on detection of the flow sensor, which detects variation in properties, if the air leaks slightly.

The reinforced layer prevents a part of the compressed air from leaking out of the volume space when the air in the volume space is compressed by external pressure. Thus, sealer, filler, undercoat, topcoat, or finishing coating may be employed as the reinforced layer. Some of these may be selected depending on the base or the foamed synthetic resin body. The foamed synthetic resin body, which is formed by forming a piece of foamed synthetic resin or a plurality of pieces of foamed synthetic resin that are stacked and bonded together into a particular shape and covers the base, may include the skin layer that is formed by using a prepared mold that forms the foamed synthetic resin body.

The reinforced layer may have two-dimensional plane structure or three-dimensional structure. The reinforcement layer with three-dimensions enables the volume space in addition to the reinforcement layer to have high strength and enables the volume space to have high density.

The flow sensor detects flow rate (liter/second) of air that flows from the volume space, in which the air is prevented from leaking to open air. As this flow sensor, micro flow censor (D6F-V03A1; Omron Corporation) that is called "MEMS flow sensor", "MEMS flow rate sensor", or "velocity sensor" on the market, was employed. In some embodiments, any commercially available censors including "MEMS flow sensor", "MEMS flow rate sensor" and "velocity sensor" may be used in principle. The inventors used D6F-V03A1 (Omron Corporation) due to need for small in size. The inventors used some products in addition to the product manufactured by the Omron Corporation as flow sensor that is commercially available. That is, the inventors used a product manufactured by Keyence Corporation, a product manufactured by Aichi Tokei Denki Co., Ltd, a product manufactured by Yamatake Corporation, and a product manufactured by ASK Co., Ltd. The inventors have confirmed that these products can be employed as the flow sensor in principle.

Additionally, a signal amplify of the flow sensor includes an operational amplifier that amplifiers the output signal of the flow sensor. In some embodiments, any amplifier circuits can serve as the signal amplify of the flow sensor.

The foamed synthetic resin of the foamed synthetic resin body may include closed cells, which are no joined inside bubbles, or open cells, which are joined inside bubbles. In any case, the air in the volume space is required to be prevented from leaking through the foamed synthetic resin to open air.

In the contact detection device according to a second aspect of the present invention, the base is composed of a piece of the foamed synthetic resin or a plurality of pieces of the foamed synthetic resin that are stacked and bonded together.

Since the base with a particular shape is composed of the foamed synthetic resin that is composed of a single or a plurality of layers that are stacked and bonded together, the base and the foamed synthetic resin body, which are opposite each other, have the same material. This provides a weight saving and easy processing such as cutting.

In the contact detection device according to a third aspect of the present invention, the reinforced layer decreases an uneven surface including a beads line and a vent hole on the cut surface, which results from a cutting of a piece of the foamed synthetic resin or a plurality of pieces of the foamed synthetic resin that are stacked and bonded together. This increases accuracy and thus air tightness on the surface.

The reinforced layer on the foamed synthetic resin body reduces unevenness having a beads line and a vent hole on the cut surface, which results from the cutting of the foamed synthetic resin, thus increasing accuracy and air tightness on the surface. This prevents the air from leaking. In any case, the reinforced layer on the foamed synthetic resin body is required to prevent a leak of the air in the volume space to open air.

In the contact detection device according to a fourth aspect of the present invention, the volume space contains an elastomeric member including open cells, which are joined inside bubbles. The elastomeric member that is composed of foamed synthetic resin plate including open cells, which are joined inside bubbles, has punched holes that is formed by punching holes at once or one by one in the foamed synthetic resin plate. Thus, this elastomeric member has a grid shape, a quadrilateral shape, a fine shark skin, polka dots, or checks.

The foamed synthetic resin plate with elasticity and open cells has punched holes and forms into any of s grid shape, s quadrilateral shape, s fine shark skin, polka dots, or checks. This foamed synthetic resin plate is used as a space holder with relatively high elasticity. This space holder has restoring and air permeability itself in the volume space, thus enabling the volume space to keep. The volume space contains the space holder to keep the volume space. When the volume space has a three-dimensional curve part, the space holder does not greatly reduce the volume of the volume space and block the air flow.

In the contact detection device according to a fifth aspect of the present invention, the flow sensor defines an auxiliary space to disperse and discharge the air that has passed through an air passage of the flow sensor. This air passage guides the air from an inlet to an outlet of the flow sensor.

The flow sensor defines the auxiliary space in which the air that has passed from the inlet to the outlet of the flow sensor is dispersed and discharged. Thus, the air is discharged and absorbed at a specific part. Consequently, no part dirty creates. In particular, the air that has passed through the flow sensor, from the inlet to the outlet, is dispersed in the auxiliary space and discharged therefrom. Thus, the air fails to partly pass through a filter. Consequently, the flow sensor will have no dusts. The pressure, with respect to external force, increases in order of the volume space, the auxiliary space, and atmosphere. This increases responsiveness of the flow sensor.

In the contact detection device according to a sixth aspect of the present invention, the flow sensor includes two flow sensors in which the one flow sensor is connected to other flow sensor in series through their air passages from the inlet to the outlet. The output of the flow sensor is logical disjunction output that is sum of signal output of two flow sensors.

The signal output of the flow sensor including two flow sensors such as "MEMS flow sensor", "MEMS flow rate sensor", or "velocity sensor" has common input and then outputs the logical disjunction that is sum of signal output of two flow sensors. This increases signal reliability and enables the flow sensor to be calibrated accurately.

Advantageous Effects of the Invention

The contact detection device according to a first aspect of the present invention includes a volume space between a base with a particular shape and a foamed synthetic resin body that covers the base and is composed of foamed synthetic resin with a particular shape. The volume space is on the base, the foamed synthetic resin or both. Air in the volume space is prevented from leaking trough the base, the foamed synthetic resin, or both to open air. In the contact detection device, at least one flow sensor detects flow rate (liter/second) of the air that flows from the volume space to open air. Output signal of the flow sensor is amplified by a signal amplify circuit.

The volume space is defined by a reinforcement layer so that compressed air in the volume space is prevented from leaking through the base and the foamed synthetic resin to open air. Consequently, the air volume passing through the flow sensor varies in response to external force that is applied to the volume space from the external, thus enabling the flow sensor to detect the external force.

Thus, the contact detection device includes the volume space in which the air is prevented from leaking trough the base and the foamed synthetic resin to open air. The volume space is between the base and the foamed synthetic resin. This volume space is on either or both of the base and the foamed synthetic resin. The output of the flow sensor determines the air flow rate (liter/second) passing from the volume space to open air in response to external force that is applied to the volume space. This is used to know variation in the volume of the volume space in response to external force that is applied to the base or the foamed synthetic resin and determine that anything including a human body has come into contact with the base or the foamed synthetic resin body.

General pressure sensors and contact sensor have failed to detect external force over a wide area, particularly, three-dimensions. However, the contact detection device according to the embodiment of the present invention easily detects such external force over a wide area, particularly, three-dimensions by using the output of the flow sensor.

In the contact detection device according to a second aspect of the present invention, the base with a particular shape is composed of foamed synthetic resin that is a simple or a plurality of layers that are stacked and bonded together.

Thus, in addition to the effects achieved in the first aspect of the invention, the base and the foamed synthetic resin can have the same properties in materials. The base and the foamed synthetic resin, which are opposite each other, are composed of the same materials. This provides weight saving and easy processing. The base can directly employ a conventional plate such as a metal plate or an injection molded plate, which is used in a housing. This provides greater flexibility for design.

In the contact detection device according to a third aspect of the present invention, the foamed synthetic resin has a reinforced layer that reduces an uneven surface with a beads line and a vent hole, and a cut surface, which results from a cutting of the foamed synthetic resin body.

In addition to the effects achieved in the first or the second aspect of the invention, the reinforcement layer on the surface of foamed synthetic resin mold or the surface of processed foamed synthetic resin plate prevents air from leaking through the foamed synthetic resin body to open air.

The reinforced layer reduces the uneven surface including the beads line and the vent hole on the cut surface, which results from a cutting of the foamed synthetic resin. This increases accuracy and air tightness of the surface. Thus, the reinforced layer prevents leakage of the air two-dimensionally or three-dimensionally. In any case, the reinforced layer on the foamed synthetic resin body only needs to prevent the air in the volume space from leaking to open air. Thus, the reinforced layer may be on the surface of the volume space or may define the volume space three-dimensionally.

In the contact detection device according to a fourth aspect of the present invention, the volume space contains a foamed synthetic resin plate with elasticity and air permeability. The foamed synthetic resin plate has punched holes that are formed by punching holes at once or a hole individually, and thus forms into s grid shape, s quadrilateral shape, a fine shark skin, polka dots, or checks accordingly.

In addition to the effects achieved in the first, the second, or the third aspect of the invention, the volume space is not empty but contains an elastomeric member including open cells. This enables the volume space to have elasticity for keeping itself. Thus, the contact detection device including the volume space with complex three-dimensions detects contact as well as the contact detection device including the volume space with two-dimensions through the variation in the volume of the volume space.

In the contact detection device according to a fifth aspect of the present invention, the flow sensor defines an auxiliary space to disperse and discharge the air that has passed from the inlet to the outlet of the flow sensor.

In addition to the effects achieved in the first, the second, the third or the fourth aspect of the invention, the flow sensor defines the auxiliary space in which the air that has passed from the inlet to the outlet of the flow sensor is dispersed and discharged. Thus, the air is discharged and absorbed at a specific part. Consequently, no part dirty creates. In particular, the air that has passed through the flow sensor, from the inlet to the outlet, is dispersed in the auxiliary space and discharged therefrom. Thus, the air fails to pass through a filter partly. Consequently, the flow sensor will have no dusts. The pressure, with respect to external force, increases in order of the volume space, the auxiliary space, and atmosphere. This raises responsiveness of the flow sensor.

In particular, the contact detection device has the auxiliary space to disperse and discharge the air that has passed through the flow sensor, from the inlet to the outlet. The auxiliary space contains the compressed air temporarily. Thus, when the air is absorbed or discharged, no part air flow creates. The air is discharged or absorbed through the auxiliary space. Thus, no part dirty creates when the contact detection device will have so many detections.

In the contact detection device according to a sixth aspect of the present invention, the flow sensor includes two flow sensors in which the one flow sensor is connected to other flow sensor in series through their air passages from the inlet to the outlet. The output of the flow sensor is logical disjunction output that is sum of signal output of two flow sensors. This enable detection to have high reliability, in addition to the effects achieved in the first, the second, the third or the fourth, the fifth aspect of the invention.

The signal output of the flow sensor including two flow sensors has common input and then outputs the logical disjunction that is sum of signal output of two flow sensors. This increases signal reliability and enables the flow sensor to be calibrated accurately by reflecting mutual output.

DESCRIPTION OF EMBODIMENTS

Figure 1:
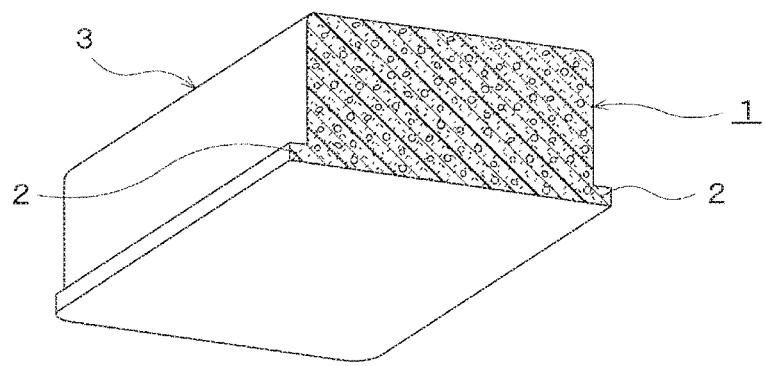
FIG. 1 is a perspective view of an example base with a particular shape according to a contact detection device of an embodiment of the present invention.
Figure 2:
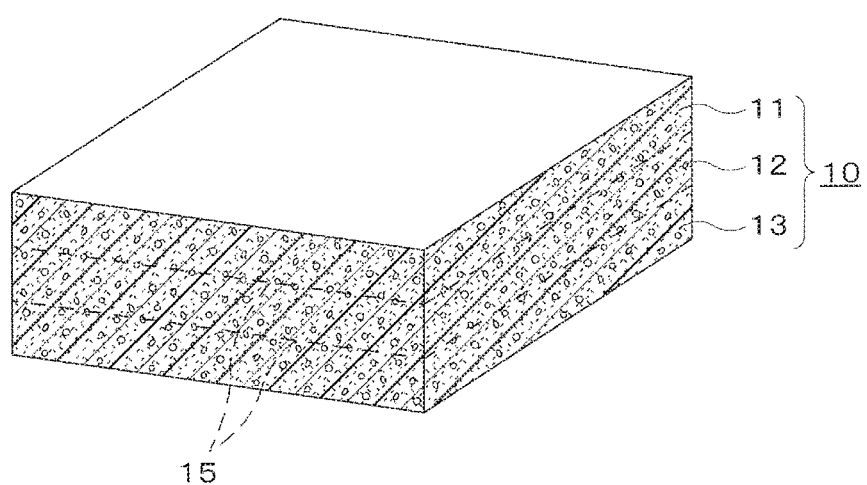
FIG. 2 is a diagrammatic view of a foamed synthetic resin body that is stacked and bonded according to the contact detection device of the embodiment of the present invention.

Embodiments of the present invention are described hereafter based on drawings. In the embodiment of the present invention, the same marks and the same codes shown in the drawings mean the same or equivalent function parts. Thus, overlapped description thereof has been omitted here.

Embodiments

A base 1 of a contact detection device according to the embodiment of the present invention is a protector used in a robot arm in FIG. 1 to FIG. 4. This base 1 is composed of, for example, solid or foamed thermoplastic resin. For example, the base 1 before cutting is sized to include a flange part 2 to bond and forms into a semicylindrical shape. From the view of a foamed synthetic resin body 10 that faces the base 1, the base 1 is cut and thus a volume space 4 is only on the exterior surface 1A of the base 1. Of course, either or both of the base 1 and the foamed synthetic resin body 10 may be cut to form the volume space 4.

The flange part 2 of the exterior surface 1A of the base 1 and the interior surface 10B of the foamed synthetic resin body 10 are glued or stuck with double-sided tape. Alternatively, the base 1 and the foamed synthetic resin body 10 may be joined together in accordance with an opening of the base 1 and an opening of the foamed synthetic resin body 10 that are fitted.

The base 1 of the present embodiment is composed of the synthetic resin with a particular shape. In some embodiments, the base 1 may be composed of aluminum plate, stainless plate, iron plate, copper plate, solid synthetic resin, or foamed synthetic resin. From the view of the foamed synthetic resin body 10 that faces the exterior surface 1A, the volume space 4 is only on the exterior surface 1A that has been cut. In some embodiments, the foamed synthetic resin body 10 may be cut. Alternatively, both the base 1 and the foamed synthetic resin body 10 may be cut. In any case, the volume space 4 is on either or both of the base 1 and the foamed synthetic resin 10 that are opposite each other. The volume space 4 typically is about 3 to 15 mm in thickness.

The volume space 4 between the base 1 and the foamed synthetic resin 10 is closed. When external pressure is applied to the foamed synthetic resin 10, the foamed synthetic resin 10 has depression in response to the pressure. This causes the volume space 4 to vary in volume and pressure. Such variation in volume of the volume space 4 causes the air to flow through a flow sensor 70, thus enabling the flow sensor 70 to detect flow rate of the air flow. Essentially, the contact detection device according to the embodiment of the present invention detects pressure that is applied to the foamed synthetic resin 10, rather than the flow rate.

Figure 3:
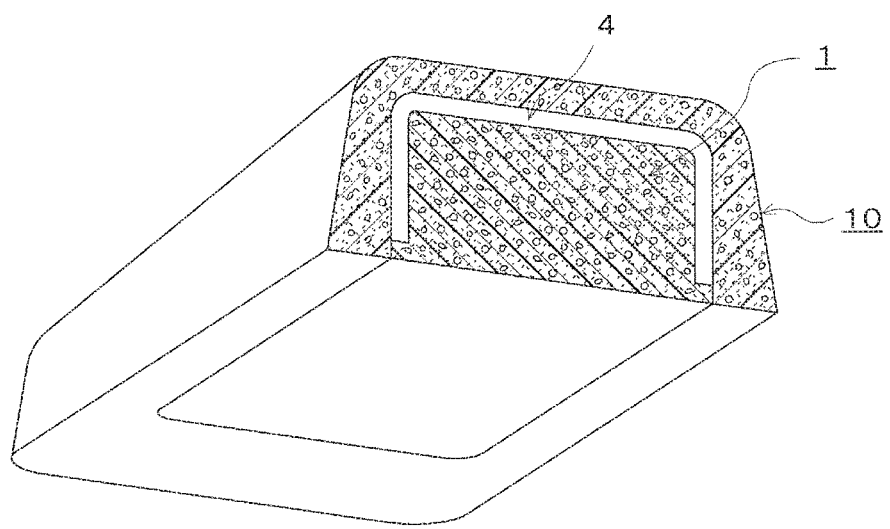
FIG. 3 is a diagrammatic view of a cross-section of the base and the foamed synthetic resin body that are fitted together according to the contact detection device of the embodiment of the present invention.
Figure 4:
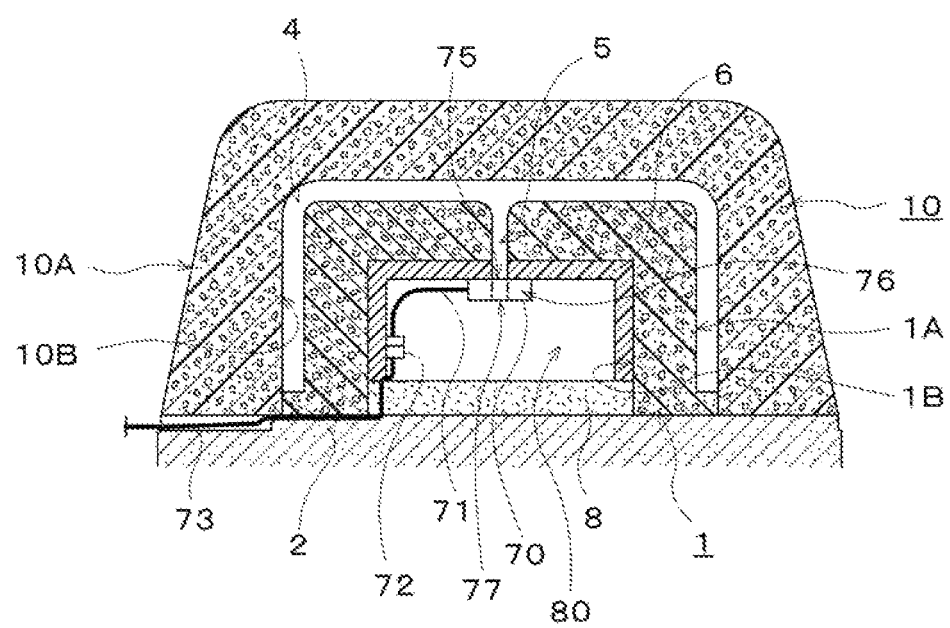
FIG. 4 is a diagrammatic view of a cross-section of the components of the contact detection device according to the embodiment of the present invention.

A specific example is illustrated by reference to FIG. 3 and FIG. 4. The foamed synthetic resin body 10 according to the contact detection device of the present embodiment is composed of foamed synthetic resin (11, 12, 13) with a particular shape. The foamed synthetic resin (11, 12, 13) is composed of thermoplastic resin that is one or more. Alternatively, the foamed synthetic resin (11, 12, 13) is composed of thermoplastic resin that is two or more layers that are stacked and bonded. The foamed synthetic resin (11, 12, 13), which is one or more, has hardness that allows the volume space 4 to have variation in volume in the foamed synthetic resin body 10. Such foamed synthetic resin body 10 may include closed cells, which are no joined inside bubbles, or open cells, which are joined inside bubbles. The foamed synthetic resin body 10 preferably is closed cells body, which has very softness and resilience, to prevent leakage of the air. The expansion ratio of such foamed synthetic resin body 10 is about 10 to 50 times. The sponge hardness of the foamed synthetic resin body 10 is preferably 10 to 50 (JIS-k-6253), more preferably, 15 to 45. This sponge hardness may be inconsistent depending on components of the foamed synthetic resin body 10.

The foamed synthetic resin of the present embodiment includes polyurethane (PUR), polystyrene (PS), polyolefin (mainly polyethylene (PE) or polypropylene (PP)), or foamed resin such as phenol resin (PF), polyvinyl chloride (PVC), urea resin (UF), silicone (SI), polyimide (PI), or melamine resin (MF). The foamed synthetic resin may include open cells, which are joined inside bubbles, or closed cells, which are no joined inside bubbles. The foamed synthetic resin preferably includes closed cells, which are no joined inside bubbles, to prevent the air in the volume space 4 from leaking through the foamed synthetic resin body 10 and the base 1 to open air.

Components and a manufacturing method of a box inner flame 6 on the foamed synthetic resin body 10 and the base 1 in FIG. 4 will be described later.

The base 1 has the same material as the foamed synthetic resin body 10 in the embodiment. Additionally, the base 1 is processed in the same way as the foamed synthetic resin body 10 in accordance with the box inner flame 6. The periphery of the base 1 is cut to form the exterior surface 1A. The box inner flame 6, which will be described below, with three-dimensions is on the exterior surface 10A and the interior surface 10B of the foamed synthetic resin body 10. Additionally, the box inner flame 6, which will be described below, with tree-dimensions is on the exterior surface 1A and the interior surface 1B of the base 1. Alternatively, the box inner flame 6, which will be described below, on the exterior surface 10A and the interior surface 10B of the foamed synthetic resin body 10 may have two-dimensions and the box inner flame 6 on the exterior surface 1A and the interior surface 1B of the base 1 may have two-dimensions.

The box inner flame 6 is glued onto the interior surface 1B of the base 1. This box inner flame 6 is for fixing the flow sensor 70. The box inner flame 6 leads air from a guide passage 5, which guides air from the volume space 4, to an inlet of the flow sensor 70, enabling the air to flow from the inlet to the outlet of the flow sensor 70. The output of the flow sensor 70 is guided to an amplifier substrate 72, which has a connector, through a lead 71. The amplifier substrate 72 is connected to a lead 73 that guides the output to the outside. The amplifier substrate 72 with an operational amplifier OP outputs "1" and "0" signal as the output through a photo coupler 74 (referring to FIG. 6). The circuit of the amplifier substrate 72 will be described later. The flow sensor 70, the amplifier and other components of the circuit may be mounted on the same substrate, of course.

The box inner flame 6 is a injection molding box. This inner flame 6 is stably installed, thus leading the air from the inlet of the flow sensor 70 to the outlet of the flow sensor 70. This causes the variation in volume of the volume space 4 to be precisely conveyed to the flow sensor 70. The inner flame 6 forms into a square box shape so that the inner flame 6 fails to move in a horizontal direction and a vertical direction. This enables variation in external force to be easily caught. A flat seal plate 8, which is made of a sponge, is on the opening side of the inner flame 6. This flat sealing plate 8 is composed of foamed synthetic resin including open cells. A space that is defined by the inner flame 6 and the flat sealing plate 8 is an auxiliary space 80. The auxiliary space 80 functions as a space that temporarily has high air pressure. This prevents the air from the volume space 4 from going out to the outside. Thus, dirty air fails to go in to the volume space 4 and the flow sensor 70 keeps clean.

The inner flame 6 with a square box shape may be formed by pressing metal plate or metal.

The auxiliary space 80 is defined by the flat seal plate 8 that is composed of the foamed synthetic resin having open cells. The pressed air from the volume space 4 flows through the guide passage 5 and then through the flow sensor 70, in which the air flows from the inlet to the outlet. This causes air pressure in the auxiliary place 80 to increase a little bit. Thus, the pressure in the auxiliary place 80 is to be close to pressure in the volume space 4. The pressure in the auxiliary place 80 is now higher than open air. This allows the air through the flow sensor 70, in which the air flows from the inlet to the outlet, to leak through the flat seal plate 8 with open cells to open air. When the pressure applied to the volume space 4 is removed, the volume space 4 introduces open air through the flow sensor 70 and the guide passage 5 to compensate short of air volume in the volume space 4. The flat seal plate 8 then functions as a filter on its whole surface. This effectively prevents partial introduction of dusts from outside and prevents clogging.

The flow sensor 70 detects flow rate (liter/second) that flows from the volume space 4, in which the air is prevented from leaking by a reinforcement layer 50 around the volume space 4, to open air. As such flow sensor, a micro flow censor (D6F-V03A1; Omron Corporation) including "MEMS flow sensor", "MEMS flowrate sensor", or "velocity sensor" on the market, was used. Any commercial sensor such as "MEMS flow sensor", "MEMS flowrate sensor", or "velocity sensor" can serve as the flow sensor in principle. The inventors used D6F-V03A1 (Omron Corporation) due to need for small in size. The inventors used and confirmed some flow sensors on the market in addition to the product manufactured by Omron Corporation. That is, the inventors used some products manufactured by Keyence Corporation, Aichi Tokei Denki Co., Ltd, Yamatake Corporation, or ASK Co., Ltd. The inventors have confirmed that these products can be employed as the flow sensor in principle.

Figure 5:
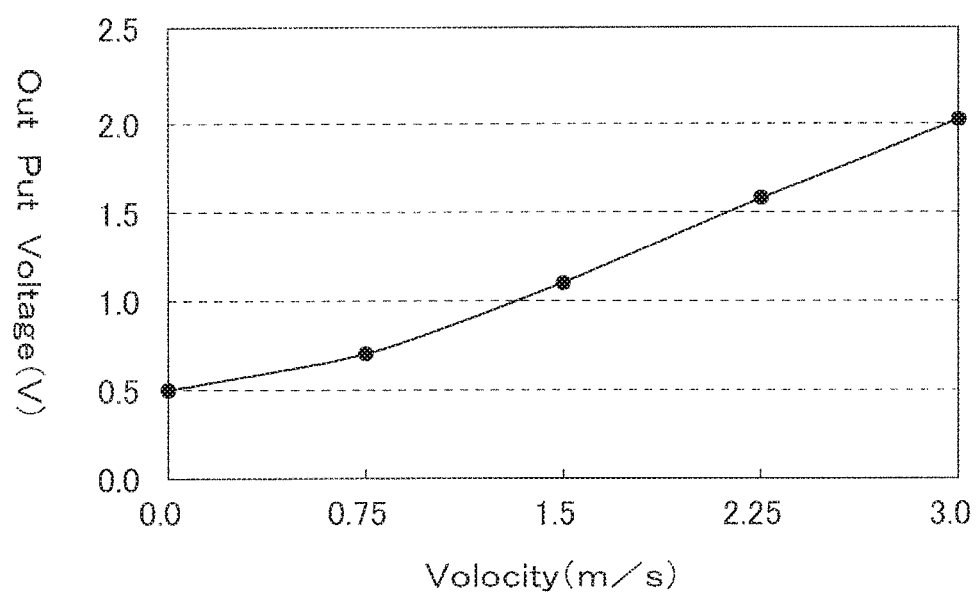
FIG. 5 is a diagrammatic view of output characteristics of a flow sensor used in the contact detection device according to the embodiment of the present invention.

The flow sensor 70 used in the embodiment is very small, which is 24 mm by 14 mm by 8 mm in dimensions. The velocity (m/s) vs the output voltage (V) relationship of the flow sensor 70 is shown in FIG. 5 that illustrates output voltage characteristics. As shown in FIG. 5, the flow sensor 70 outputs 0.7 V in the output voltage under 0.75 m/s. Thus, the flow sensor 70 has high sensitivity.

The flow sensor 70 is connected to the lead line 71 including three lines that are composed of two power lines and one output signal line. The lead line 73 that is the output of lead line 71 is connected to an electronic control circuit (not shown), which operates the robot. Such line is usually used as a red flag signal to stop the robot suddenly.

Figure 6:
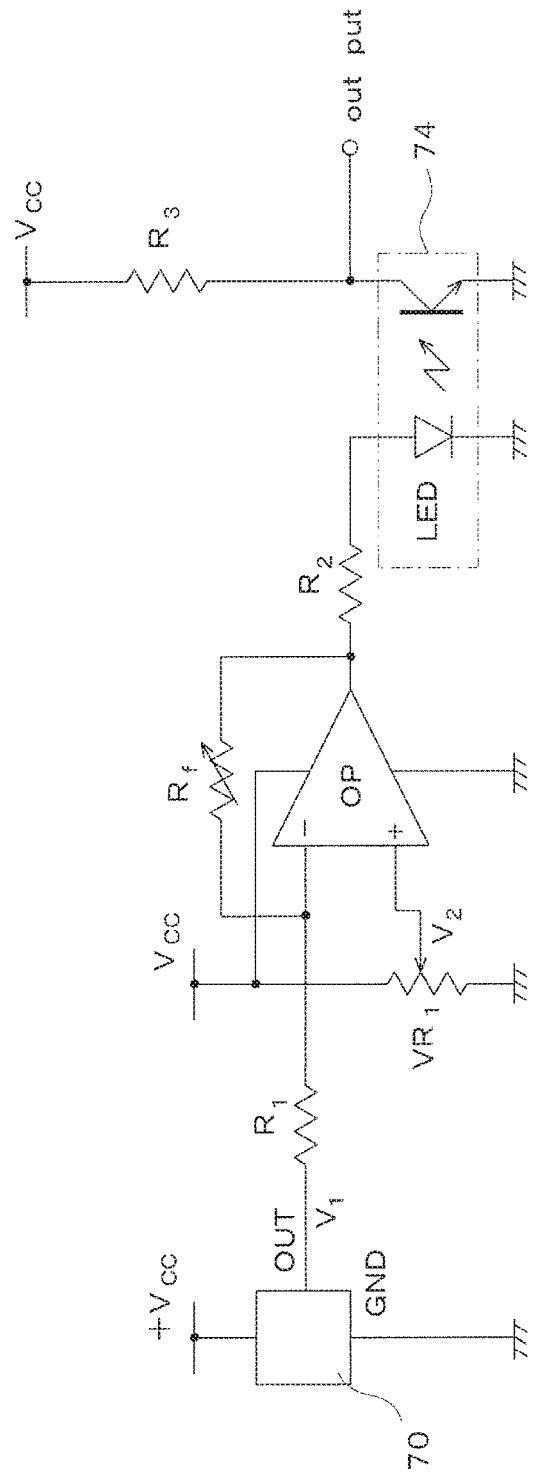
FIG. 6 is a circuit diagram of an output circuit of the flow sensor used in the contact detection device according to the embodiment of the present invention.

A detection circuit of the flow sensor 70 shown in FIG. 6 has an inverting amplifier including a resistor $R_1$ and a feedback resistor $R_f$. The detection circuit further has a non-inverting circuit in which output of a potentiometer is input. Thus, output V of a differencing amplifier is shown as $V=(V_2-V_1) \cdot R_f/R_1$.

A resistor $R_2$ is a current limiting resistor of LED input as a photocoupler. The LED output is input to a phototransistor. Thus, detection output of the flow sensor 70 is obtained in a state where the flow sensor 70 is insulated from the differencing amplifier including the operational amplifier. Thus, a wiring of the detection circuit of the flow sensor 70 fails to short-circuit at an unpredictable part.

With respect to the flow sensor 70 of the present embodiment, the volume space 4 is on either or both of the base 1 and the foamed synthetic resin body 1, which are opposite each other. The volume space 4 may have curves, tortuosity, or differences in intervals.

Figure 7C:
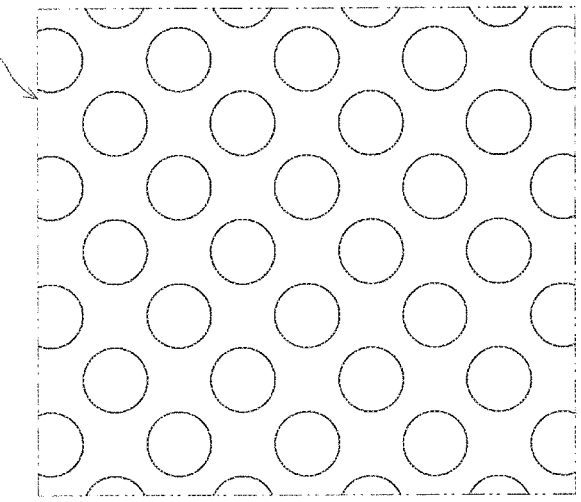
FIG. 7C is a diagrammatic view of a space holder used in the contact detection device according to the embodiment of the present invention. This space holder is a foamed synthetic resin plate that is composed of an elastomeric member with a fine shark skin or polka dots that is formed by punching.
Figure 7C:
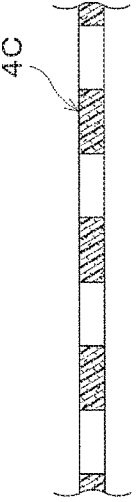
Figure 7B:
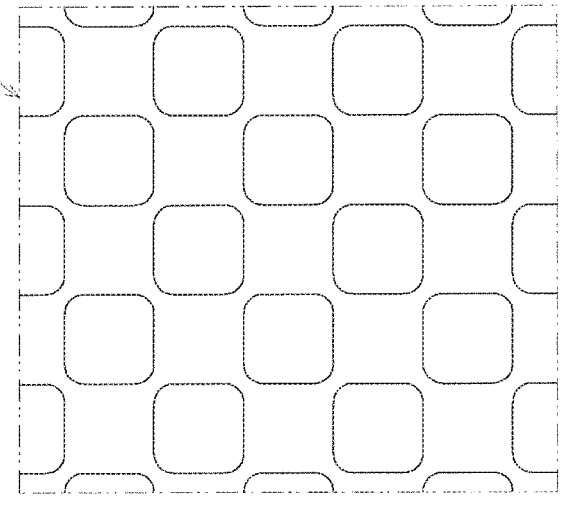
FIG. 7B is a diagrammatic view of a space holder used in the contact detection device according to the embodiment of the present invention. This space holder is a foamed synthetic resin plate that is composed of an elastomeric member with checks formed by punching.
Figure 7B:
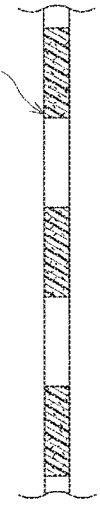
Figure 7A:
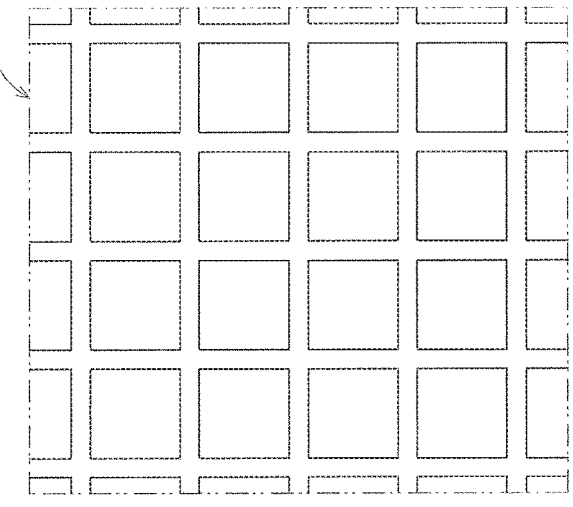
FIG. 7A is a diagrammatic view of a space holder used in the contact detection device according to the embodiment of the present invention. This space holder is a foamed synthetic resin plate that is composed of an elastomeric member with a grid shape formed by punching.
Figure 7A:
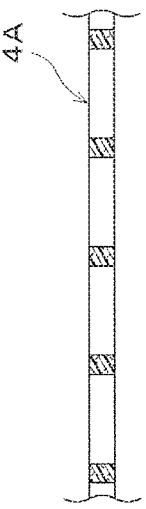

FIGS. 7A, 7B, and 7C show examples of measures against such volume space 4.

The volume space 4 contains an elastomeric member such as a space holder 4A, 4B or, 4C with air permeability. This space holder includes open cells, which are joined inside bubbles. The space holder 4A has punched holes and thus forms into a grid shape in FIG. 7A. The space holder 4B has punched holes and thus forms into quadrilateral checks shown in FIG. 7B. The space holder 4C has punched holes and thus forms into a fine shark skin, or polka dots shown in FIG. 7C. The elasticity of such space holder 4A, 4B or 4C retains the space of the volume space 4. Thus, the volume space 4 has balanced space. The elastomeric member, which has punched holes and thus forms into the grid shape, the quadrilateral checks, the fine shark skin, or the polka dots, is open cells body including joined inside bubbles. Thus, this elastomeric member will have no stagnation and other characteristics according to a pressure transmission low (Pascal's principle).

The space holder 4A, 4B 4C, or other holders may be made of a sponge rubber with open cells.

Figure 8:
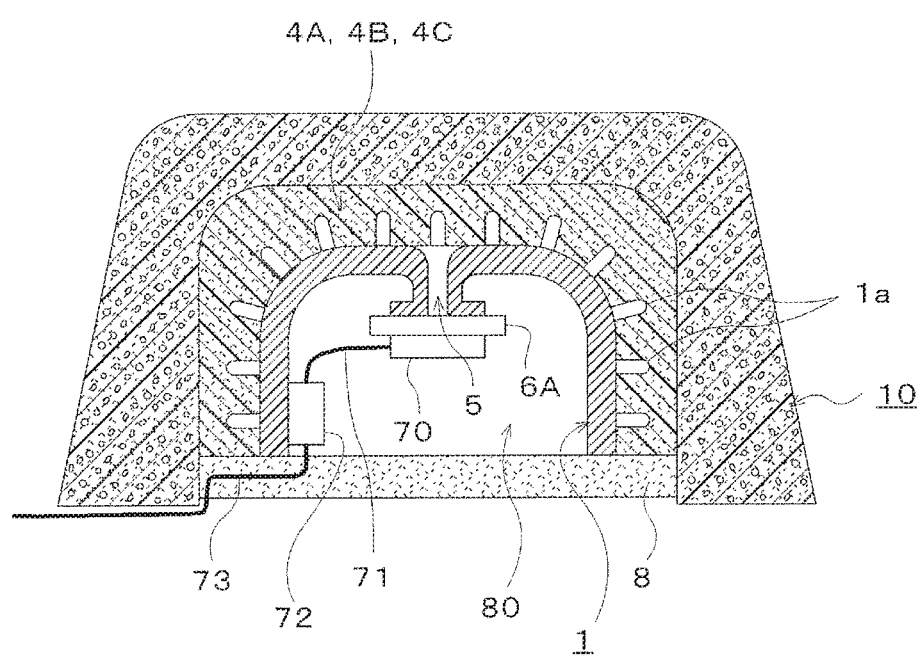
FIG. 8 is a diagrammatic view of another example of the space holder used in the contact detection device according to the embodiment of the present invention.

The contact detection device of the present embodiment may employ other examples such as FIG. 8.

The volume space 4 contains the foamed synthetic resin plate 4A, 4B, or 4C. The foamed synthetic resin plate 4A, 4B, or 4C has open cells, which are joined inside bubbles. Such foamed synthetic resin plate 4A, 4B, or 4C may be on the base 1 with a protrusion 1a, which is formed by injection molding, so that the foamed synthetic resin plate 4A, 4B, or 4C fails to move. In this case, the protrusion 1a prevents the foamed synthetic resin plate 4A, 4B, or 4C from moving. In this embodiment, the contact detection device has the foamed synthetic resin plate 4A, 4B, or 4C, which includes open cells that are joined inside bubbles. This causes the volume space 4 to vary in response to external force that is applied to any part of the foamed synthetic resin body 10. Thus, the flow sensor 70 operates.

In particular, the volume space holder 4A, 4B, or 4C with open cells may have holes at opposite position of the protrusions 1a, which is formed by injection molding. This easily determines the position of the volume space holder 4A, 4B, or 4C.

A flame 6A with a quadrilateral plate shape is used in place of the inner plate 6 and is a junction standard. Alternatively, the flow sensor 70 may be directly attached to the base 1 without the flame 6A.

Referring to FIG. 9 to FIGS. 17A, 17B, 17C, and 17D steps of manufacturing the contact detection device, the foamed synthetic resin body 10 and the reinforcing layer 50 according to the embodiment of the present invention is schematically described here.

A cover of a robot and a cover of a housing in various apparatus are typically composed of a plate of aluminum, stainless, iron, or copper in some embodiments. Synthetic resin including foamed synthetic resin is mainly formed by injection molding. The base 1 formed by such injection molding is typically composed of one block of thermoplastic resin. In the contact detection device of the present embodiment, the base 1 that is one block formed by injection molding or other molding is described as an example.

The base 1 may be composed of one or more thermoplastic resin with a particular shape. The base 1 may be composed of the foamed synthetic resin (11, 12, 13) that includes two or more stacked and bonded layers and forms into a particular shape. The base 1 may be composed of one solid synthetic resin with a particular shape. The base 1 may be composed of a plurality of solid synthetic resin plates with a particular shape. Of course, they have the same basic structure as the base 1 that is formed by injection molding or other molding.

Figure 9:
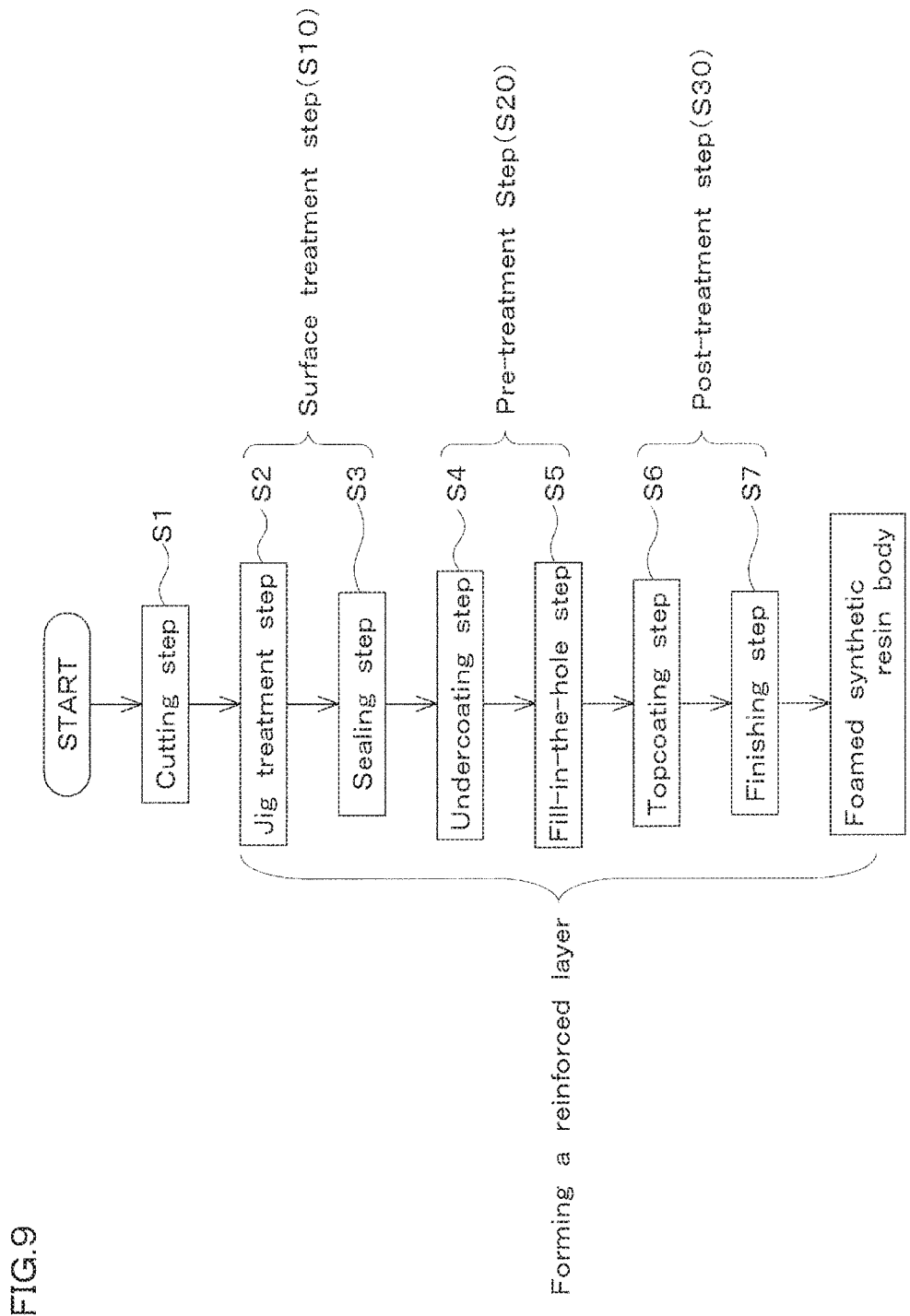
FIG. 9 is a flowchart showing a method of manufacturing the contact detection device according to the embodiment of the present invention.

In a cutting step of STEP S1, foamed synthetic resin made from thermoplastic resin is cut into a particular shape, thus forming the target foamed synthetic resin body 10, as shown in FIG. 9. The whole foamed synthetic resin may be cut into a particular shape. Alternatively, only the inside of the foamed synthetic resin may be cut or only the outside of the foamed synthetic resin may be cut. As the cutting tool, a ball end mill 20 (referring to FIGS. 10A and 10B) is employed.

The ball end mill 20 may be an apparatus including a manual jig. The cutting method is not limited.

A surface treatment step (STEP S10) includes a jig treatment step of STEP S2 and a sealing step of STEP S3. In the jig treatment step of STEP S2, a cut surface resulting from the cutting step of STEP S1 and a surface to be coated 18 (referring to FIG. 15) of the foamed synthetic resin are harden by frictional heat on a heating jig 30. The surface to be coated 18 includes the cut surface 14 (referring to FIGS. 10A and 10B, and FIG. 11).

In the jig treatment step of STEP S2, the heating jig 30 (referring to FIG. 13) spins around on the surface to be coated 18 that has finished with the cutting step and then the spinning heating jig 30 hits the surface to be coated 18 softly. This yields the frictional heat. This frictional heat allows the surface to be coated 18 (referring to FIG. 15) of the foamed synthetic resin to be hardened.

The heating jig 30 against the surface generates the frictional heat on the surface in the cutting step of STEP S1. Such frictional heat forcibly cuts a fluffy fiber W, a particle X, and a vent hole Z on the surface to be coated 18 as shown FIG. 16A that will be described below. The fiber W includes one or more fibers that have failed to be cut by a side blade 21 and extend thread-like. This fiber W is partially fluffed. The particle X is composed of the joined curling fiber. The vent hole Z with about 2 to 10 mm in diameter is seen everywhere on the surface to be coated 18 as shown FIGS. 16A, 16B, 16C, and 16D.

Additionally, or alternatively, the frictional heat softens the fluffy fiber W, the particle X and the vent hole Z, and then the heating jig 30 presses the fluffy fiber W, the particle X and the vent hole Z. This integrates the fluffy fiber W, the particle X and the vent hole Z into the foamed synthetic resin. Additionally, or alternatively, the frictional heat removes a part of the foamed synthetic resin that has softened and then has extended thread-like in the cutting. Additionally, or alternatively, the frictional heat softens the part of the foamed synthetic resin and then the heating jig 30 presses the part of the foamed synthetic resin. This integrates the part of the foamed synthetic resin into the whole foamed synthetic resin. Consequently, a standing beads line softens and then is pressed, thus being flat. Additionally, unevenness on the expanded beads of the beads line is reduced and the periphery of the vent hole Z hardens.

In the jig treatment step of STEP S2, the heating jig 30 heats the cut surface 14 (referring to FIGS. 10A and 10B) of the foamed synthetic resin, and softens this cut surface 14 accordingly, thus forming a flat surface without fuzz and powder. In some embodiments, a laser light scan or a hot plate may soften the surface of the foamed synthetic resin made from thermoplastic resin. These may yield a harden surface.

The term "flat" typically means "even and smooth". The flat described in the embodiment of present invention does not need wide range of flat. The flat only need to be partial flat. This partial flat means, for example, "even a place that has variation in angle such as chamfered edge has no steep variation in unevenness.

The surface treatment step (STEP S10) further includes the sealing step of STEP S3. In the sealing step of STEP S3, the synthetic resin including toluene, cellulose acetate butyrate (CAB), and butyl acetate, which are used in typical synthetic resin coating, is used as a sealer 41 (referring to FIGS. 16A, 16B, 16C, and 16D). This sealer 41 is applied to the surface to be coated 18 of the foamed synthetic resin. Such sealer 41 hardens the surface to be coated 18 of the foamed synthetic resin body 10, prevents a flank in polishing, and allows the surface to be polished with, for example, sandpaper, or waterproof sandpaper. This yields surface shape with good accuracy. The jig treatment step of STEP S2 and the sealing step of STEP S3 are different in physical hardening or scientific curing, but both are substantially the same surface treatment that hardens the surface to be coated 18 including the cut surface 14, which results from the cutting step of STEP S1, of the synthetic resin body 10. Either the jig treatment step of STEP S2 or the sealing step of STEP S3 may be selected depending on materials of the foamed synthetic resin body 10, preferably, both the jig treatment step of STEP S2 and the sealing step of STEP S3 are employed in view of product resistance.

An undercoating step of STEP S4 is a pre-treatment step (STEP S20) in which synthetic resin is applied to the coated surface 18 of the synthetic resin body 10 to reduce and even the uneven surface including the beads line, the vent hole Z. The synthetic resin body 10 frequently has the vent hole Z with about 2 to 10 mm in diameter. Thus, a fill-in-the-hole step of STEP S5 is ideally conducted as measures against the hole.

In the pre-treatment step (STEP S20), the undercoat 43 shown in FIGS. 17A, 17B, 17C and 17D is prepared mixing curing agent, primersurfacer and thinner for viscosity control, and then this prepared undercoat 43 is applied to the coated surface 18 of the foamed synthetic resin body 10. Subsequently, the dried coated surface 18 is polished. Such application and polish are repeated from one to twelve times. This flattens or smooths the coated surface 18. When the synthetic resin body 10 has the vent hole Z, the fill-in-the-hole step of STEP S5 is conducted. In the fill-in-the-hole step of STEP S5, polyester resin putty is used as a filler 42 (referring to FIGS. 16A, 16B, 16C, and 16D). The application, the drying, and the polish are repeated in accordance with the size of the hole at the undercoating step of STEP S4. Depending on the size of the vent hole Z, it may be preferable that firstly the vent hole Z is filled in with the filler 42, after which the coated surface 18 is repeatedly coated, dried and polished.

In a flowchart of FIG. 9, which shows the steps of manufacturing the synthetic resin body 10 according to the contact detection device of the present embodiment, the undercoating step of STEP S4 and the fill-in-the-hole step of STEP S5 are separated. In some embodiments, the undercoating step of STEP S4 and the fill-in-the-hole step of STEP S5 may be carried out at the same time. Alternatively, the undercoating step of STEP S4 may be carried out, but the fill-in-the-hole step of STEP S5 may be not carried out. Alternatively the undercoating step of STEP S4 and the fill-in-the-hole step of STEP S5 may be carried out in reverse order.

In any case, the undercoat process step of STEP S4 and the fill-in-the-hole step of STEP S5 constitute the pre-treatment step of STEP S20. In this pre-treatment step of STEP S20, the beads line, the uneven surface, and the vent hole Z on the surface to be coated is coated with the curing agent, the primersurfacer, the thinner for viscosity control and the putty so that the beads line, the uneven surface, the vent hole Z do not appear on the surface.

Following the pre-treatment step (STEP S20), a post-treatment step (STEP S30) is carried out. In the post-treatment step (STEP S30), synthetic resin coating including pigment is applied to the coated surface 18 resulting from the pre-treatment step (STEP S20). In this post-treatment step (STEP S30), topcoat 44 (referring to FIG. 15) used in a topcoating step of STEP S6 is a mixture of curing agent, resin coating, primersurfacer and thinner. These curing agent, resin coating, and primersurfacer are the same as the undercoat 43 used in the undercoating step of STEP S4. This allows the undercoat 43 and the topcoat 44 to have chemistry and high bonding strength between the undercoat 43 and the topcoat 44. The resin coating is white in the embodiment. In some embodiments, the resin coating may be other color.

The post-treatment step (STEP S30) may include a finishing step of STEP S7. In the finishing step of STEP S7, resin coating as finishing coating 45 (referring to FIG. 15) is applied. Such finishing coating 45 includes curing agent, resin coating and thinner. When the post-treatment step (STEP S30) includes the finishing step of STEP S7, not only the pigment but also the topcoat 44 that includes curing agent, resin coating, primersurfacer and thinner needs to have chemistry with the finishing coating 45.

In such finishing step of STEP S7, forming a coating yields resistance, for example, weather resistance or acid resistance. In some embodiments, this coating is the same as typical coating, that is, this coating is conducted simultaneously with the whole coating including a mechanical equipment coating. Alternatively, the foamed synthetic resin body 10 may be coated, after which it may be attached to a body or other units of the mechanical equipment.

Of course, the coating is not limited to a coating including colored pigment. For example, the coating may be transparent and have ultraviolet rays protection.

The foamed synthetic resin body 10 and the reinforcement layer 50 will be described in more detail. The same description is true for the base 1 when the base 1 is composed of the foamed synthetic resin.

The sealer 41 is applied to the surface to be coated 18 of the foamed synthetic resin body 10 of the present embodiment. This sealer 41 hardens the surface to be coated 18, prevents a flank in polishing, and allows the surface to be coated 18 to be freely polished. This yields the surface shape with good accuracy.

The prepared undercoat 43, which is mixture of curing agent, primersurfacer and thinner for viscosity control, is applied to the coated surface 18 of the synthetic resin body 10 and then the coated surface 18 in the dry state is polished. Repeating the application and the polish causes the coated surface 18 to be flat and smooth. Depending on the size of the vent hole Z, the filler 42 is applied to the vent hole Z to fill up the hole before the undercoat 43 is applied.

Additionally, the coated surface 18 is coated with the topcoat 44, which is synthetic resin coating including pigment. This topcoat 44 is mixture of curing agent, resin coating, primersurfacer and thinner. Such topcoat 44 includes the same curing agent, primersurfacer and thinner as the undercoat 43. This allows the undercoat and the topcoat to have chemistry and increases bond strength between the undercoat and the topcoat.

Figure 15:
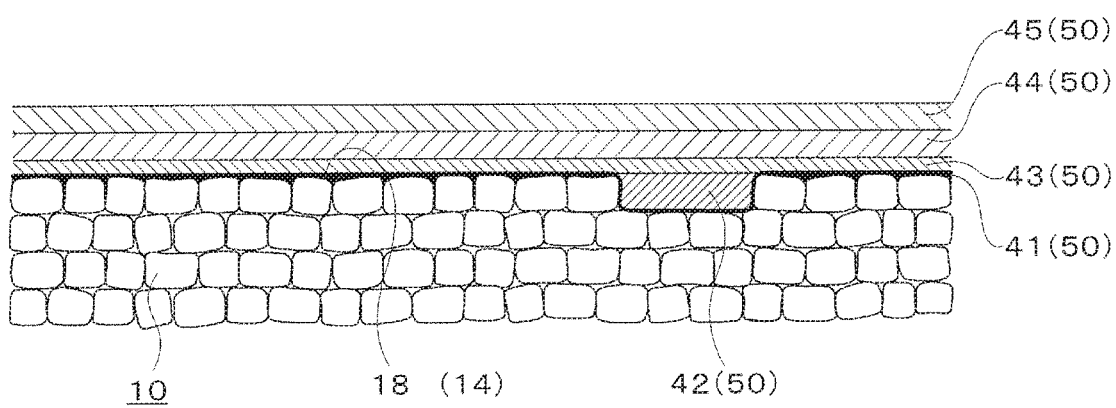
FIG. 15 is a diagrammatic view of layer components of the contact detection device according to the embodiment of the present invention.

Thus, the foamed synthetic resin body 10 of the present embodiment has the coated surface 18 which the sealer 41 has been applied to as shown in FIG. 15. This sealer 41 hardens the surface to be coated 18, thus enabling the surface shape to have good accuracy. Additionally, the coated surface 18 is coated with the undercoat 43, which is mixture of curing agent, primersurfacer and thinner for viscosity control. The coated surface 18 with the undercoat 43 in the dry state is polished. Repeating the application and the polish enables the coated surface 18 to be flat and smooth. The hole in the foamed synthetic resin body 10 is filled in with the filler 42 as necessary. Additionally, the coated surface 18 is coated with the topcoat 44, which is synthetic resin coating including pigment. This topcoat 44 is mixture of curing agent, the resin coating, primersurfacer and thinner. Such topcoat 44 includes the same curing agent, primersurfacer and thinner as the undercoat 43. This allows the undercoat and the topcoat to have chemistry and increases bond strength between the undercoat and the topcoat.

In the foamed synthetic resin body 10 of the present embodiments, the sealer 41, which allows surface shape to have good accuracy, may be omitted depending on conditions of the surface to be coated 18. Additionally, the filler 42 may be omitted depending on the size of the vent hole Z. The undercoat 43, which is mixture of curing agent, primersurfacer and thinner for viscosity control, is applied to the surface to be coated 18. This makes the surface to be coated 18 flat. The synthetic resin coating that is used as the topcoat 44 including pigment, may be applied to the coated surface 18 as needed. This topcoat 44 is mixture of curing agent, resin coating, primersurfacer and thinner. Such topcoat 44 includes the same curing agent, primersurfacer and thinner as the undercoat 43. Thus, when the pigment is not required to be applied, only undercoat 43, which is mixture of curing agent, primersurfacer and thinner for viscosity control, may be applied.

The reinforcement layer 50 of the foamed synthetic resin body 10 shown in FIG. 15 to FIGS. 17A, 17B, 17C, and 17D will be described in more detail.

The foamed synthetic resin body 10 is foamed thermoplastics resin. The synthetic resin row materials of the foamed synthetic resin body 10 may mainly include polyurethane (PUR), polystyrene (PS), or polyolefin including mainly polyethylene (PE) or polypropylene (PP). Alternatively, the synthetic resin row materials may include foamed resin such as phenol resin (PF), polyvinyl chloride (PVC), urea resin (UF), silicone (SI), polyimide (PI) or melamine resin (MF). In particular, it is preferable that the foamed synthetic resin body 10 is composed of synthetic resin that softens at range from 80 to 200 when the cut surface 14 of the foamed synthetic resin body 10 is to be hardened by heating. In some embodiments, the expansion ratio of the foamed synthetic resin body 10 is not limited. Depending on use application, the foamed synthetic resin body 10 may need limited expansion ratio to be hard-finished while the foamed synthetic resin body 10 has elasticity.

A particular block formed by foaming and a laminated standardized-product may be employed as foamed resin particles (foamed beads) used in the present example, when the foamed resin particles is made from polyethylene $(C_2H_4)_n$ or polypropylene $(C_3H_6)$. This has been found in experiments.

Specifically, the polyethylene beads that is fine-grained polyethylene with about 1 mm in diameter and has absorbed hydrogen gas is softened trough steam with 100 or greater in temperature and is pressed, and is foamed accordingly. This enables the expanded beads to be fused together. The expanded beads vary in units of beads in cooling. This yields the foamed polyethylene.

The inventors used foamed the synthetic resin (11, 12, 13) that is composed of three pieces of standardized polyethylene, which has a specific length, width and height (1200×900×60 mm) and is commercially available. Individual foamed synthetic resin (11, 12, 13) composed of the polyethylene is single foam molding item with standardized dimensions. Such foamed synthetic resin (11, 12, 13) has a skin layer with high density on the surface. The vent hole Z in such foamed synthetic resin (11, 12, 13) is about 2 to 10 mm in diameter. To obtain a product having a thickness of above 50 mm, the standardized foamed synthetic resin (11, 12, 13) has rubber-based adhesive on their facing surfaces, which are the skin layer, and is lamination in the present example.

The rubber-based adhesive 15 that is rubber cement in non-toluene can (Marusue Oil Co., Ltd.) or bond (G700X7 (Konishi Co., Ltd.)), which is rubber cement, was spread on the surfaces that are to be bonded together, followed by drying the cement. The surfaces with cement were faced, and then pressed to be bonded. The bond (G700X7 (Konishi Co., Ltd.)) as the rubber-based adhesive 15 includes mainly cyclohexane, n-heptane, and acetone.

The rubber-based adhesive 15 has the thinnest possible thickness so that the rubber-based adhesive 15 is invisible. It is only required that the rubber-based adhesive 15 achieves keeping a bond. As the rubber cement, the rubber-based adhesive 15 that is composed of the same polyethylene as the foamed synthetic resin (11, 12, 13) as the base, may be employed.

As other rubber-based adhesive, vulcanizing adhesive such as spray adhesive 55 (Sumitomo 3M Co., Ltd.) or valkarn (Maruni Industry Co., Ltd.) on the market may be employed.

The polyethylene as the foamed synthetic resin (11, 12, 13) and the rubber-based adhesive 15 are different in the properties, of course. The rubber-based adhesive 15 to bond the foamed synthetic resin (11, 12, 13) allows the layer of the adhesive to have a thickness of 100 µm or less. Such rubber-based adhesive 15 did not interfere with product processes. Thus, the rubber-based adhesive 15 was employed to bond the foamed synthetic resin (11, 12, 13). The facing surfaces to be bonded together in the foamed resin (11, 12, 13) came into contact with each other and were instantly heated with hot plates. The resultant melting surfaces were bonded together. The inventors verified that the resulting bond is good although bonding needs for skill. As the adhesive 15, polyethylene-based adhesive that is the same types as the polyethylene used in the foamed synthetic resin (11, 12, 13) may be employed. Alternatively, laser beam scanning may heat the facing surfaces to be bonded together in the foamed synthetic resin body 10. In any case, it is only required that melting and hardening surfaces of the foamed synthetic resin (11, 12, 13) have negligible volume. Specifically, it is only required that the layer of the adhesive including melting, has a thickness of 300 µm or less, preferably, 100 µm or less. Of course, the adhesive that is the same type as the foamed synthetic resin body 10 may be employed as the adhesive 15.

The inventors stacked polyethylene with adhesion or polypropylene with adhesion as the standardized foamed synthetic resin (11, 12, 13) that has a specific length, width and height (1200×900×60 mm). Thereafter, the resulting stuck is pressed at 0.5 to 10 t and more pressure per unit area. Thus, the polyethylene or the polypropylene was stacked. In some embodiments, stacking may be unnecessary when the product with a demanded thickness is commercially available. The pressure for bonding is determined depending on the expansion ratio of the foamed body and foamed materials of the base. The pressure is not limited.

Thus, the foamed synthetic resin (11, 12, 13) of the embodied product of the present invention may be composed of a single or a stack with a plurality of layers where necessary. Of course, the foamed synthetic resin body 10, which is directly the base of the embodied product of the present, may be foamed and form into a predetermined outline shape in a mold.

Figure 10A:
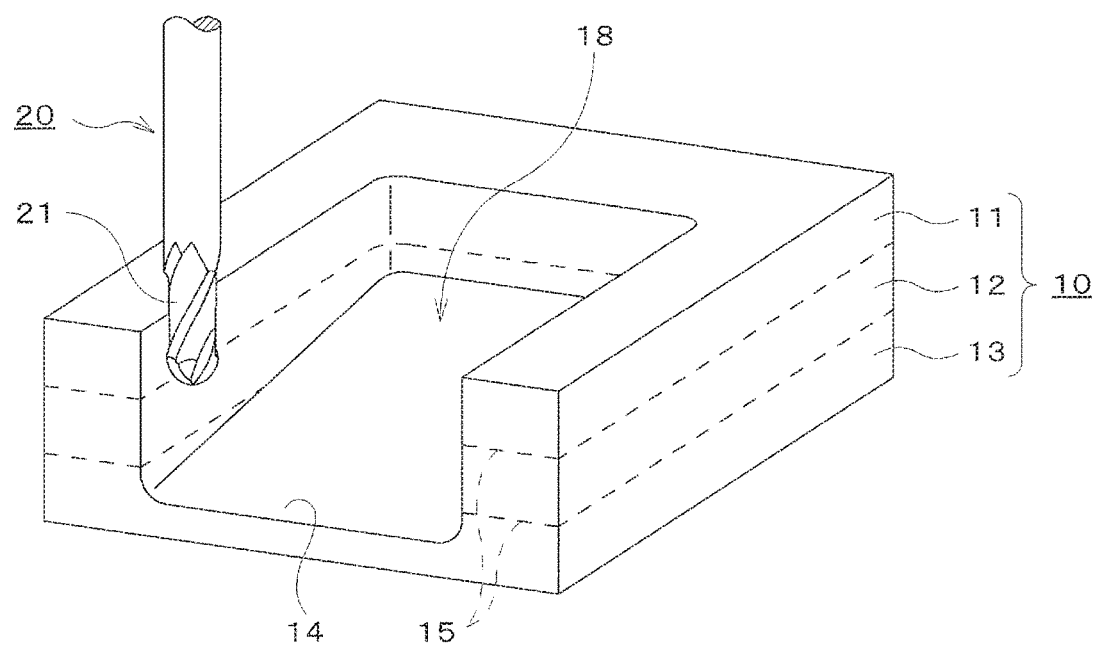
FIG. 10A is a diagrammatic view of a cutting step of a stacked foamed synthetic resin in the method of manufacturing the contact detection device according to the embodiment of the present invention. This diagrammatic view shows the foamed synthetic resin under cutting.
Figure 10B:
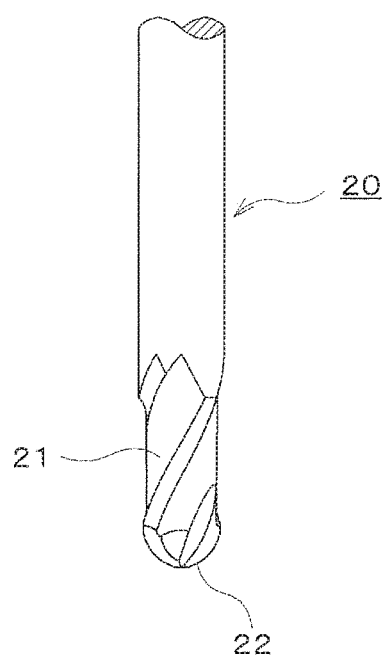
FIG. 10B is a diagrammatic view of a cutting step of a stacked foamed synthetic resin in the method of manufacturing the contact detection device according to the embodiment of the present invention. This diagrammatic view shows a cutting tool.
Figure 11:
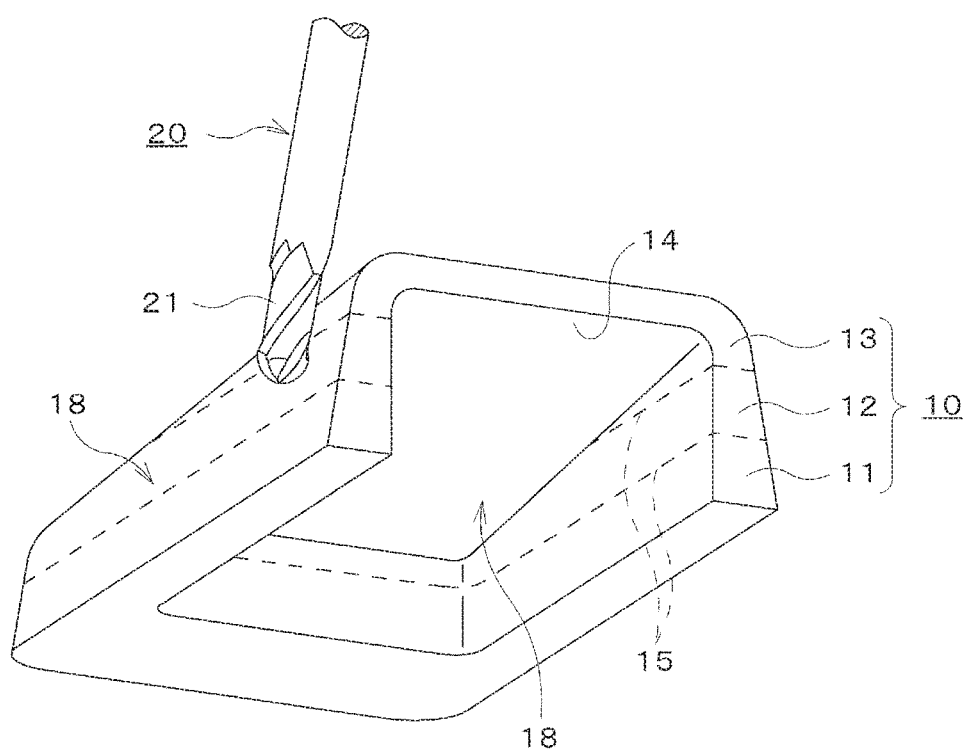
FIG. 11 is a diagrammatic view of a stacked and bonded foamed synthetic resin under cutting according to the contact detection device of the embodiment of the present invention.

The ball end mill 20, which is a cutting tool used for cutting, was used to cut the foamed synthetic resin body 10 as shown in FIGS. 10A and 10B. This ball end mill 20 is similar to a drill, which is a type of a milling cutter, in appearance. The drill going in the axial directions is used for drilling a round hole. The ball end mill 20 is used for cutting and expanding the hole in the direction perpendicular to the axial by using a side blade. Additionally, the ball end mill 20 is used for evening an end face. Although the ball end mill 20 has imperfect cutting edge in the center, the ball end mill 20 has arch shape edge and this allows the end face to be flat finished. The ball end mill 20 revolves at 5000 to 15000 rpm. The ball end mill 20 is fed at 500 to 3000 mm speed. The ball end mill 20 typically revolves at about 1000 rpm and is fed at about 2000 mm speed.

In the embodiment of the present invention, a whole outline is formed by cutting with the ball end mill 20, which is widely used in cutting. The cut surface that results from a cutting of the whole outline with the ball end mill 20 is crumbly as the part of cut waste has been peel off by external force. Alternatively, the cut surface has partial connections as fibers or has projections and depressions.

The ball end mill 20 with the side blade 21 is commonly used for cutting and expanding the hole in the direction perpendicular to the axial as shown in FIGS. 10A and 10B. The ball end mill 20 used in the embodiment of the present invention is the same as above. The ball end mill 20 is coated with fluorocarbon resin (polytetrafluoroethylene: PTFE) at a range from lowermost to the side blade 21. This prevents the ball end mill 20 from having the cut of the foamed synthetic resin body 10 and its cut waste.

In the ball end mill 20, the rotation causes the blade with a curved end part 22, in which the lower end slightly protrudes downward, to have the frictional heat. This frictional heat enables the surface to be flat. This means decreasing projections and depressions on the surface. This flat is caused by separating particles, which is imperfectly cut off by the side blade 21 being in contact with the surface of the foamed synthetic resin body 10, or pressing soften particles. Alternatively, the flat is caused by eliminating or pressing the part where the foamed synthetic resin body 10 is softened and extends thread-like in the cutting. Alternatively, the flat is caused by softening and pressing standing beads lines.

FIGS. 10A and 10B show the state in which the ball end mill 20 cuts the outside of the cut surface 14, which is in the inside of the foamed synthetic resin body 10 shown in FIGS. 10A and 10B.

For example, a contact angle between the ball end mill 20 and the foamed synthetic resin body 10, transfer distance and transfer angle of the ball end mill 20 relative to the foamed synthetic resin body 10 determine the outline of the foamed synthetic resin body 10 in the cutting. This cutting technique is typical cutting technique. Thus, a detailed explanation of this cutting technique has been omitted.

Figure 12A:
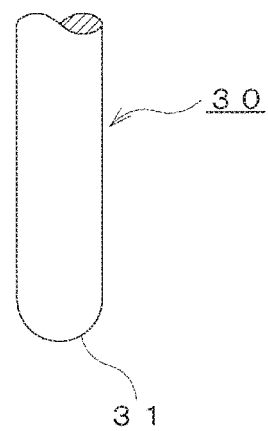
FIG. 12A is a perspective view of a heating jig with a single diameter used in a surface treatment step in which a surface to be coated of the foamed synthetic resin of the contact detection device according to the embodiment of the present invention is heated.
Figure 12B:
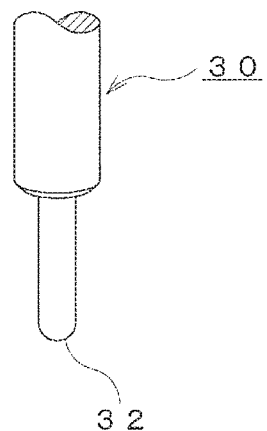
FIG. 12B is a perspective view of a heating jig with two-steps diameters used in a surface treatment step in which a surface to be coated of the foamed synthetic resin of the contact detection device according to the embodiment of the present invention is heated.
Figure 13:
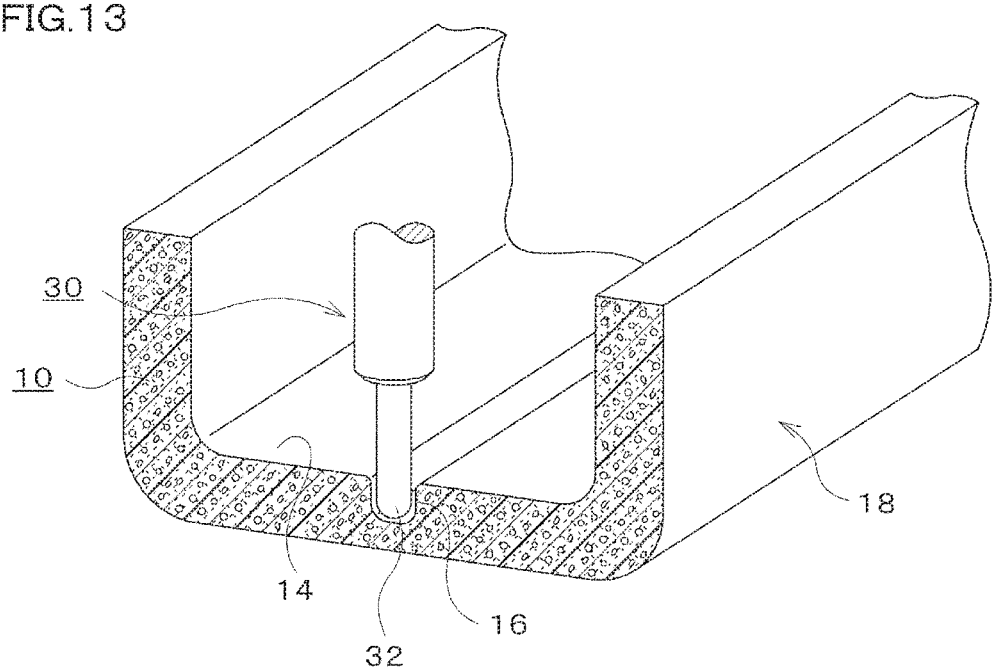
FIG. 13 is a diagrammatic view of a cutting step in which a groove for a lead line is formed on the inside top of the foamed synthetic body of the contact detection device according to the embodiment of the present invention.

The heating jig 30 shown in FIGS. 12A and 12B heats the cut surface 14 in the foamed synthetic resin body 10 using the friction on a specific friction surface 31 with a curved end surface. This follows the cutting, in which the commercial ball end mill 20 is used. FIG. 12A is a perspective view of the heating jig 30 with a single diameter. FIG. 12B is a perspective view of the heating jig 30 with two-steps diameters. The heating jig 30 is coated with the fluorocarbon resin on any part where the frictional heat is generated. This prevents the softened resin from adhering to the heating jig 30.

The heating jig 30 has the friction surface 31 that has a predetermined curved surface at the lowest end of a thickness. The frictional heat on the friction surface 31 heats the surface to be coated that includes the cut surface 14 of the foamed synthetic resin body 10, and the base and thus softens the surface to be coated as the temperature increased. This flattens the cut surface 14 of the foamed synthetic resin body 10. A surface protruding downward or a surface opening downward is formed in the same way as the flat is formed.

When the cut surface 14 that has a narrow recessing groove 16, which surface protrudes downward, is to be formed, the heating jig 30 that heats the cut surface 14 has the friction surface 32 with a thin diameter generally or partially as shown in FIG. 12A. Such heating jig 30 is suitable for, for example, forming the recessing groove 16 shown in FIG. 13. The heating jig 30 may have a tapered surface as necessary. The heating jig 30 illustrated in FIG. 12A has two-steps diameters. Alternatively, the heating jig 30 may have three-steps or more diameters, or a uniform diameter.

Figure 14:
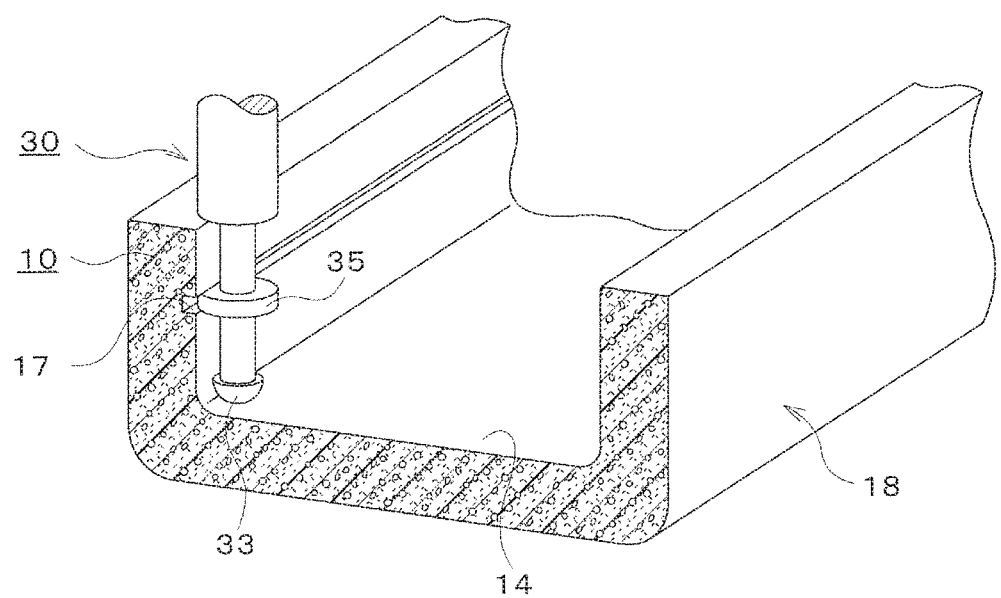
FIG. 14 is a diagrammatic view of a cutting step in which a groove for a lead line is formed on the side of inside of the foamed synthetic body of the contact detection device according to the embodiment of the present invention.

The foamed synthetic resin body 10 shown in FIG. 14 has a recess shape groove 17, where lead line 71, 73 or other line is placed on, at the side. This recess shape groove 17 is formed by the friction and a heated surface is formed on the cut surface 14 in the inside of the foamed synthetic resin body 10. This occurs when a lower round part 33 of the heating jig 30 heats the inside curve part of the foamed synthetic resin body 10 with the friction as an upper round part 35 of the heating jig 30 heats the recess shape groove 17 with the friction. The heating jig 30 is coated with fluorocarbon resin on any part where the frictional heat is generated. This prevents the heating jig 30 from having the softened resin.

In some embodiments, the heating jig 30 may have any shape. The exterior of the foamed synthetic resin body 10 is design surface and the cutting surface 14 side, which is the interior of the foamed synthetic resin body 10, often receives, for example, an apparatus. As a matter of course, the foamed synthetic resin body 10 is not limited to this use.

In the embodiment, a step in which the foamed synthetic resin body 10 composed of thermoplastic resin is cut into a particular shape with the blade used for the cutting, such as the ball end mill 20, is the cutting step of STEP S1. The surface resulting from the cutting is to be the surface of the harden layer that is physicochemicaly hardened with heating jig 30. Such harden layer formed with the heating jig 30 typically is many tens to one hundred or less micrometres and the hardness varies in a row. Thus, the harden layer is generally recognized as only about the surface.

In the embodied product of the present embodiment, the harden layer that is hardened with the heating jig 30 has no particle powder of the foamed synthetic resin body 10 and no thread-like extending part. Thus, whether the jig treatment step of STEP S2 has been carried out or not is verified by seeing particle powder and the thread-like extending part.

In the present embodiment, the heating jig 30 heats the cut surface 14, which is the cut part of the foamed synthetic resin body 10, and softens the cut surface 14 with an increasing temperature. This flattens the surface having the particle powder, the surface having the partial fuzzy string that extends thread-like, and the powdery surface of the foamed synthetic resin body 10 physicochemicaly. In some embodiments, the laser scan, instead of the heating jig 30 with the frictional heat, softens the surface of the foamed synthetic resin body 10, thus enabling the surface to be thin and harden in a plane. This laser scan has provided an equivalent effect of using the heating jig 30 that generates the frictional heat.

The step in which the surface to be coated 18 is harden is the surface treatment step (STEP S10). Such surface to be coated 18 of the foamed synthetic resin body 10 includes the cut surface 14 resulting from the cutting step of STEP S1. The surface treatment step (STEP S10) includes hardening the surface to be coated 18 of the foamed synthetic resin body 10, which is the base, with the heating jig 30 that generates the frictional heat or the laser scan.

Following the heat of the cut surface 14 resulting from the cutting, synthetic resin as the sealer 41 in STEP S3 is applied to the cut and heated surface resulting from the cutting and the heating to reduce unevenness on the surface. This forms the reinforcement layer 50. The sealer 41 hardens the surface to be coated 18 of the foamed synthetic resin body 10. The sealer 41 that is mixtures of 28 Wt % toluene, 15 to 20 Wt % cellulose acetate butyrate (CAB), and 55 to 60 Wt % butyl acetate is applied to the surface of the foamed synthetic resin body 10 five to ten times. This application of the sealer 41 composed of the synthetic resin prevents coating from soaking into micropores between the expanded beads of the foamed synthetic resin body 10. One application is imperfect to seal as air bubbles or other characteristics are in the sealer 41. Thus, the polish with, for example, sandpaper or waterproof sandpaper and the application are repeated. The reinforcement layer 50 includes the layer of the sealer 41.

The inventors tested other synthetic resin in addition to the mixtures of toluene, cellulose acetate butyrate (CAB) and butyl acetate and confirmed whether the other synthetic resin will be available for the sealer 41. The tests showed that the synthetic resin that is bonded to the surface of the foamed synthetic resin body 10, has suitable high viscosity, and is not peeled off by dry is available for the sealer 41. The sealer 41 yields a flat synthetic resin film that prevents soaking of the synthetic resin coating. The sealer 41 includes water sealer, oil-based sealer, or synthetic resin sealer. Any sealer that keeps bond to the foamed synthetic resin body 10 is available for the sealer 41. Paint is available for the sealer 41 although it is uneconomical.

While the sealer 41 is applied one time to twelve times, the hardened layer of the sealer 41 is polished. In this situation, the sealer 41 is again applied to the layer that becomes failure in the polish. Thus, such application and polish are repeated. This step is the sealing step of STEP S3. The sealer 41 on the surface is polished by, for example, sandpaper or waterproof sandpaper. About No. 100 sandpaper is firstly used for the polish, after which gradual finer sandpaper is used for the polish.

When the polish is not to be effective, the step is transferred from the sealing step of STEP S3 to next undercoat step of STEP S4, which is the pre-treatment step (STEP S20).

The sealing step of STEP S3 has function that prevents soaking of the synthetic resin coating. Additionally, the jig treatment step of STEP S2, in which the frictional heat of the heating jig 30 of the present embodiment or the laser scan hardens the surface to be coated 18 of the foamed synthetic resin body 10 that is the base, has function that increases the density of the surface of the foamed synthetic resin body 10 with the frictional heat and the pressure. Both sealing step and jig treatment step have the same effect in basic function. Thus, either the sealing step of STEP S3 or the jig treatment step of STEP S2 may be omitted. Alternatively, both steps may be conducted.

The undercoat 43 was then prepared mixing 1 Wt % curing agent, 1 Wt % primersurfacer and 1 Wt % thinner for viscosity control and this undercoat 43 was applied.

As the curing agent, cyclohexanon peroxide (Saippoku space clear (Shizuoka Kawaguchi chem Co., Ltd.)) was used. This Saippokuspaceclear includes 48 Wt % cyclohexanon peroxide, 14 Wt % triethyl phosphate, 7 Wt % ethyl acetate, 7 Wt % ethyl acetoacetate, 13 Wt % dimethyl phthalate and 11 Wt % silicon dioxide.

The primersurfacer is called "purasafu". The primersurfacer has function of primer that allows over coating to be put on well and function of surfacer that fills a fine scrape resulting from, for example, sandpaper. The primersurfacer used in the present embodiment is, for example, auto SPS primersurfacer (Dai Nippon Toryo Co., Ltd. (#1100ZN)), R-M multi filler (diamont), R-M prof (diamont).

In specific example of the present invention, #Uretakkusu curing agent (Saito Paint Co., Ltd.) was used as the curing agent. This agent includes 1 Wt % hexamethylene diisocyanate, 50 to 60 Wt % butyl acetate, 1 to 10 Wt % propylene glycol monomethyl ether acetate, 3 Wt % xylene, 3 Wt % ethylbenzene, and 30 to 40 Wt % modified polyisocyanate.

Additionally, KAR Primer-Surfacer (Kansai Paint Co., Ltd.) was used as the primersurfacer. This primersurfacer includes 1 to 5 Wt % titanium dioxide, 18 Wt % toluene, 2.4 Wt % xylene, 2 Wt % ethylbenzene, 1 to 5 Wt % methyl alcohol, 0.1 to 1 Wt % ethyl alcohol, 1 to 5 Wt % isopropyl alcohol, 1 to 5 Wt % isobutyl alcohol, 1 to 5 Wt % methyl isobutyl ketone, 5 to 10 Wt % ethyl acetate, 10 to 15 Wt % isobutyl acetate, 5 to 10 Wt % nitrocellulose, and 5 to 15 Wt % oxidative polymerization resin.

Furthermore, Uretakkusuthinner (Saito Paint Co., Ltd.) was used as the thinner for viscosity control. This thinner includes 30 to 40 Wt % butyl acetate, 36 Wt % toluene, 10 Wt % xylene, 1 to 10 Wt % propylene glycol monomethyl ether acetate, and 10 Wt % ethylbenzene.

In the undercoat step of STEP S4, the undercoat 43 is applied to the surface which the sealer 41 has been applied to and then been polished. Additionally, the surface with the undercoat 43 is polished. These application and polish are repeated a plurality of times. The way of the application is typically spray with a spray gun. The quantity of the thinner determines the viscosity of the primersurfacer and the viscosity of the curing agent that are sprayed.

Following application of the undercoat 43, the surface with the undercoat 43 is polished with, for, example, sandpaper or waterproof sandpaper to be flattened and smoothed. The application and the polish are repeated multiple times. The polish with sandpaper or waterproof sandpaper is described here. Alternatively, other polish such as wet sanding may be employed. The reinforcement layer 50 includes the layer of the undercoat 43.

The undercoat step of STEP S4 enables the unevenness including the beads line and the vent hole on the coated surface 18 of the foamed synthetic resin body 10 to be flat. The coated surface 18 of the foamed synthetic resin body 10 frequently has not only the uneven surface with the beads line but also with the vent hole Z. This vent hole Z is about 2 to 10 mm in diameter. Thus, such vent hole with about 2 to 10 mm in diameter and the uneven surface with the beads line that has been failed to be removed in the previous step, which is the undercoat step of STEP S4, are removed in the fill-in-the-hole step of STEP S5.

In the fill-in-the-hole step of STEP S5, polyrack Z (Chubu Kaken Kogyo Co., Ltd.), which is polyester resin putty, was used as the filler 42 in the present example. This polyrack Z includes 18.3 Wt % styrene, and 0.1 Wt % cobalt naphthenate. The reinforcement layer 50 includes the layer of the filler 42

In the undercoat step of STEP S4, the undercoat 43 is prepared mixing the curing agent, the primersurfacer and the thinner for viscosity control and this prepared undercoat 43 is then applied to the coated surface 18 of the foamed synthetic resin body 10, followed by polishing the coated surface 18 with a dry state. These application and polish are repeated from one time to twelve times to even the coated surface 18. The fill-in-the-hole step of STEP S5 is conducted when the foamed synthetic resin body 10 has the vent hole Z, while the undercoat step of STEP S4 is conducted. In this fill-in-the-hole step of STEP S5, the polyester resin patty is employed as the filler 42. Applying, drying and polishing in the undercoat step of STEP S4 are repeated in accordance with the size of the hole. Depending on the size of the vent hole Z, it may be preferable that the vent hole Z is filled in with the filler 43 initially and then the application, dry and polish of the coated surface 18 are repeated.

In this example, the undercoat step of STEP S4 and the fill-in-the-hole step of STEP S5 were separated. In some embodiments, the undercoat step of STEP S4 and the fill-in-the-hole step of STEP S5 may be conducted simultaneously. Alternatively, the fill-in-the-hole step of STEP S5 may not be carried out. In any case, the undercoat step of STEP S4 and the fill-in-the-hole step of STEP S5 constitute the pre-treatment step of STEP S20. This pre-treatment step is carried out so that the uneven surface including the beads line, and the vent hole Z is to be invisible from the outside. The pre-treatment step is the step that enables the vent hole Z, the beads line and the uneven surface to be invisible. The fill-in-the-hole step of STEP S5, in which the vent hole Z is filled in, is the step that enables the vent hole Z, the beads line and the uneven surface to be invisible. Thus, the pre-treatment step (STEP S20) includes the fill-in-the-hole step of STEP S5.

When the pre-treatment step of STEP S20 is to include the fill-in-the-hole step of step S5, the fill-in-the-hole step of STEP S5 may immediately follows the sealing step of step S3 depending on the size of the hole. When the foamed synthetic resin body 10 has no vent hole Z, the fill-in-the-hole step (STEP S5) may be omitted, of course.

The reinforcement layer 50 includes the layer of the undercoat 43.

Following multiple times repeated application and polish of the undercoat 43, the topcoat 44 is applied in the post-treatment step (STEP S30). The topcoat 44 used in the post-treatment step (STEP S30) is mixtures of 1 Wt % resin coating, 2 Wt % primersurfacer and 2.6 Wt % thinner relative to 1 Wt % curing agent. Such topcoat 44 is applied. The curing agent, the 2 Wt % primersurfacer and the 2.6 Wt % thinner are the same material used in the undercoat step (STEP S4).

In the example, #55 Uretakkusu (Unleaded) White (Saito Paint Co., Ltd.) was used as the resin coating. This includes 20 to 30 Wt % titanium oxide, 15 Wt % toluene, 1 to 10 Wt % butyl acetate, 5.4 Wt % ethylbenzene, 5.4 Wt % xylene, and 1 to 10 Wt % propylene glycol monomethyl ether acetate.

Additionally, a top surface of the topcoat 44 that is applied in the topcoat step of STEP S6 is polished and then the application and the polish are repeated a plurality of times. In this STEP S6, the resin coating that is synthetic resin coating including pigment is applied to the coated surface 18 resulting from the undercoat step of STEP S4. Thus, this step is the topcoat step of STEP S6.

In this example, the #55 Uretakkusu (Unleaded) White (Saito Paint Co., Ltd.) was used as the resin coating. This allows the resin coating to be overlain with any colors. When this recoat is to be carried out in conjunction with a coating of other components, the recoat and the coat of the other components are carried out in the same coating process.

The reinforcement layer 50 includes the layer of the topcoat 44.

As previously described, the #55 Uretakkusu (Unleaded) White (Saito Paint Co., Ltd.) was used as the resin coating in the topcoat step of STEP S6 and this allows the resin coating to be overlain with any colors. In addition, a finishing step of STEP S7, in which coating for durability is applied to form the coat on the surface, may be added. In the finishing step of step S7, the coating including 1 Wt % resin coating and 0.8 Wt % thinner relative to 0.4 Wt % curing agent is applied as the finishing coating 45.

As the curing agent in the finishing coat 45, Retan PG eco; Multi Curing Agent for Spoiler (Kansai Paint Co., Ltd.), which is an isocyanate-based curing agent, was used in the example. This includes 5 to 10 Wt % ethyl acetate, 0.1 to 1 Wt % hexamethylene diisocyanate (HMDI) UR, 5 to 10 Wt % hexamethylene diisocyanate oligomer, and 165 to 70 Wt % HMDI-based polyisocyanate.

As the resin coating in the finishing coat 45, Retan PG80; 531 White Base (Kansai Paint Co., Ltd.) was used in the example. This includes 1 to 5 Wt % amorphous silica A, 20 to 25 Wt % titanium dioxide, 36 Wt % toluene, 0.1 to 1 Wt % xylene, 0.1 to 1 Wt % ethylbenzene, 0.1 to 1 Wt % ethyl alcohol, 1 to 5 Wt % methyl ethyl ketone, 1 to 5 Wt % ethyl acetate, and 1 to 5 Wt % isobutyl acetate.

As the thinner in the finishing coat 45, Retan PG Thinner Super-slow-drying Type (Kansai Paint Co., Ltd.) was used in the example. This includes 15 to 20 Wt % petroleum naphtha G, 1 to 5 Wt % petroleum naphtha H, 20 Wt % xylene, 18 Wt % ethylbenzene, 0.1 to 1 Wt % cumene, 3 Wt % 1,3,5-trimethylbenzene, 0.1 to 1 Wt % naphthalene, 9.8 Wt % 1,2,4-trimethylbenzene, 1 to 5 Wt % methoxybutyl acetate, and 1 to 5 Wt % butyl acetate.

The finishing layer that is the coat on the top surface yields durability including weather resistance and acid resistance. In some embodiments, coating may be carried out as the same as general coating, that is, coating may be carried out at the same time as the whole coating in accordance with a machine if need. Alternatively, coating may be carried out independently, followed by attaching the resultant to the machine, for example, its body.

The reinforcement layer 50 includes the layer of the finishing coating 45.

The cutting step, the surface treatment step and the pre-treatment step of the foamed synthetic resin body 10 are described in more detail with reference to FIG. 15 to FIGS. 17A, 17B, 17C, and 17D.

Foamed synthetic resin composed of thermoplastic resin is cut into a particular shape, thus forming the foamed synthetic resin body 10 in the cutting step of STEP S1 as shown in FIG. 15 to FIGS. 17A, 17B, 17C, and 17D. Specifically, the surface to be coated 18 of the foamed synthetic resin body 10 has the fiber W and the particle X as shown in FIG. 16A. The fiber W has failed to be cut by the side blade 21, extends thread-like and is partially fluffed. The particle X is the joined curling fiber. In addition, the surface to be coated 18 has the vent hole Z everywhere.

Figure 16A:
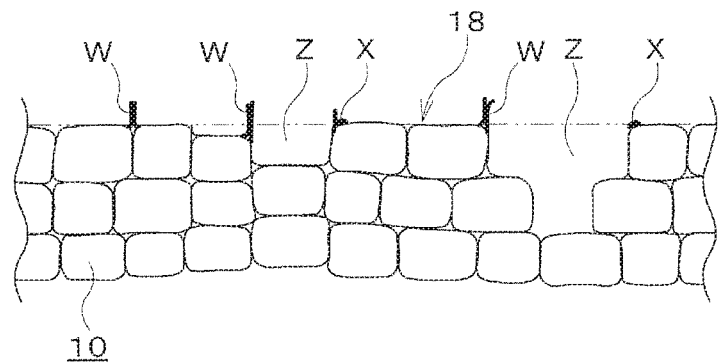
FIG. 16A is a diagrammatic view showing a process step of the contact detection device according to the embodiment of the present invention. This diagrammatic view is an enlarged cross-section showing a state where a cutting process has been finished.
Figure 16B:
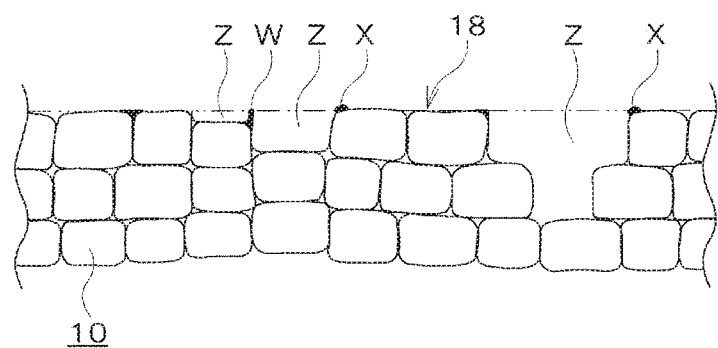
FIG. 16B is a diagrammatic view showing a process step of the contact detection device according to the embodiment of the present invention. This diagrammatic view is an enlarged cross-section showing a state where a heat jig step has been finished.

By contrast, in a state where jig treatment step of STEP S2 is finished, the fiber W, which has failed to be cut by the side blade 21, extends thread-like and is partially fluffed, decreases minimally in volume as shown in FIGS. 16A and 16B. This is caused by surface tension resulting from the frictional heat. Additionally, the fiber W is evened by the frictional heat, or comes off as powder particle and then is removed as well as the particle X, which is the joined curling fiber. At this time, the vent hole Z hardly changes although the opening of the vent hole Z is slightly narrowed by the fiber W, which extends thread-like and is partially fluffed, and the particle X, which has come off as the powder particle and has been removed.

Figure 16C:
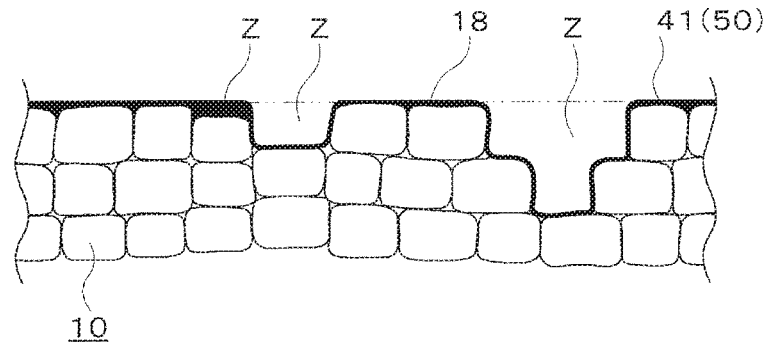
FIG. 16C is a diagrammatic view showing a process step of the contact detection device according to the embodiment of the present invention. This diagrammatic view is an enlarged cross-section showing a state where a sealing step has been finished.

In the sealing step of STEP S3, the sealer 41 that is synthetic resin coating including toluene, cellulose acetate butyrate (CAB), and butyl acetate, which are used in typical synthetic resin coating, is applied to the surface to be coated 18 of the foamed synthetic resin body 10. This sealer 41 composed of the synthetic resin hardens the surface to be coated 18 of the foamed synthetic resin body 10, eliminates a flank in polishing and enables the surface to be freely polished. This yields the surface shape with good accuracy as shown in FIG. 16C. At this time, a shallow recess surface in the beads line on the surface to be coated 18 is filled up with the sealer 41.

Figure 16D:
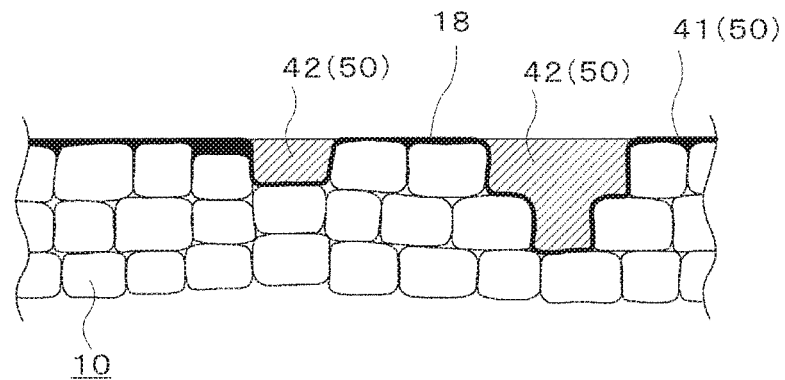
FIG. 16D is a diagrammatic view showing a process step of the contact detection device according to the embodiment of the present invention. This diagrammatic view is an enlarged cross-section showing a state where a fill-in-the-hole step has been finished.
Figure 17A:
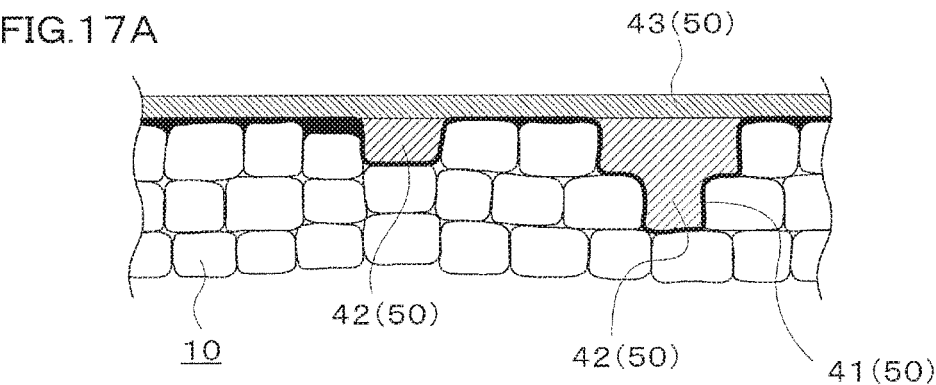
FIG. 17A is a diagrammatic view showing a process step of the contact detection device according to the embodiment of the present invention. This diagrammatic view is an enlarged cross-section showing a state where an undercoat has been finished.
Figure 17B:
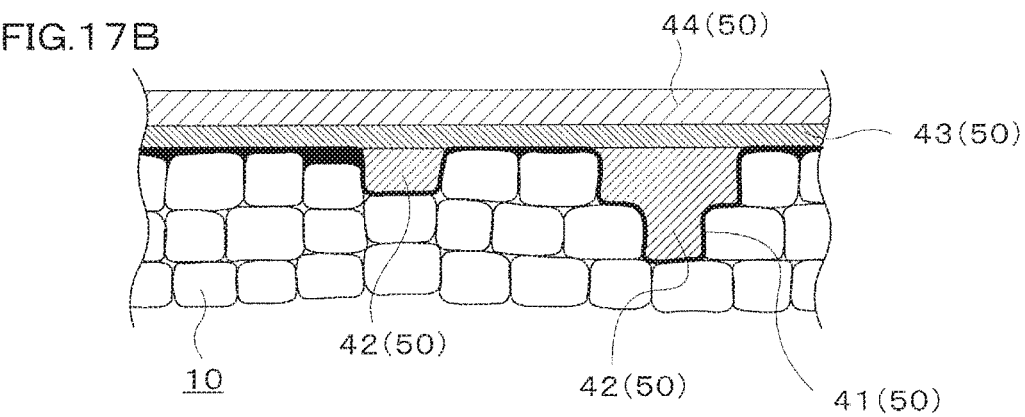
FIG. 17B is a diagrammatic view showing a process step of the contact detection device according to the embodiment of the present invention. This diagrammatic view is an enlarged cross-section showing a state where a topcoat step has been finished.
Figure 17C:
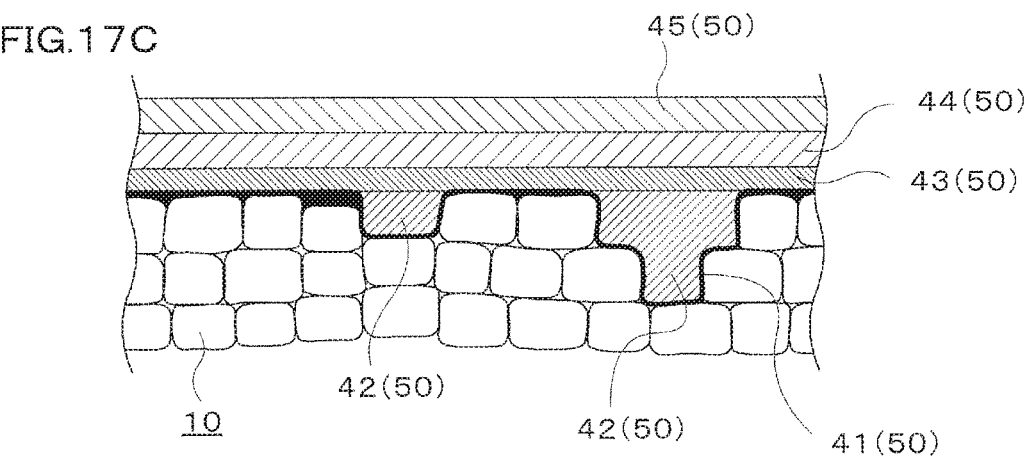
FIG. 17C is a diagrammatic view showing a process step of the contact detection device according to the embodiment of the present invention. This diagrammatic view is an enlarged cross-section showing a state where a finishing step has been finished.
Figure 17D:
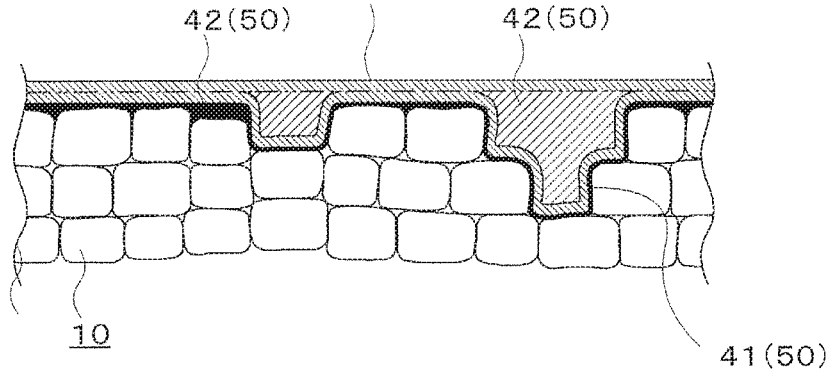
FIG. 17D is a diagrammatic view showing process step of the contact detection device according to the embodiment of the present invention. This diagrammatic view is an enlarged cross-section of an example in which filling a hole is prioritized.

The undercoating step of STEP S4 is the pre-treatment step (STEP S20) in which the application of the synthetic resin reduces and flattens the uneven surface including the beads line and the vent hole Z on the coated surface 18 of the foamed synthetic resin body 10. The synthetic resin body 10 frequently has the vent hole Z with about 2 to 10 mm in diameter. In this regard, the fill-in-the-hole step of STEP S5 is ideally conducted to take measures for the hole. In the pre-treatment step (STEP S20), the undercoat 43 including curing agent, primersurfacer and thinner for viscosity control is applied to the coated surface 18 of the foamed synthetic resin body 10 and then the resultant surface with a dry state is polished. Such application and polish are repeated one time to twelve times. This enables the coated surface 18 to be flat or smooth. When the foamed synthetic resin body 10 has the vent hole Z, the vent hole Z is filled in with polyester resin patty that is used as the filler 42 in the STEP S5. The application of the undercoat 43, drying, and polish in the undercoat step of STEP S4 are repeated in accordance with the size of the hole. Depending on the size of the vent hole Z, it may be preferable that the vent hole Z is initially filled in with the filler 42 and then the application of the undercoat 43, drying and polish to the coated surface 18 are repeated as shown in FIG. 16D.

The pre-treatment step (STEP S20) is followed by the post-treatment step (STEP S30). In the post-treatment step (STEP S30), synthetic resin that is the topcoat 44 including pigment is applied to the coated surface 18 resulting from the pre-treatment step (STEP S20). The topcoat 44 includes curing agent, resin coating, primersurfacer and thinner. This topcoat 44 used in the post-treatment step (STEP S30) is the same as the coating that is used in the undercoat step of STEP S4. This enables the undercoat 43 and the topcoat 44 to have chemistry and a strong bond.

The post-treatment step (STEP S30) may include the finishing step of STEP S7. The finishing coating 45 including curing agent, resin coating and thinner is used in the post-treatment step (STEP S30). The topcoat 44, which includes curing agent, resin coating, primersurfacer and thinner, needs to have chemistry with the finishing coating 45. This is also true in pigment, of course. Thus, the reinforcement layer 50 is formed. Such reinforcement layer 50 prevents compressed air in the determined volume space 4 between the base 1 and the foamed synthetic resin body 10 of the embodiment of the present invention from leaking through the base 1 and the foamed synthetic resin body 10 to the outside.

Forming the reinforcement layer 50 of the foamed synthetic resin body 10 of the embodiment described above includes the cutting step of STEP S1, the surface treatment step (STEP S10), the pre-treatment step (STEP S20), and the post-treatment step (STEP S30). In the cutting step of STEP S1, the foamed synthetic resin body 10 composed of thermoplastic resin is cut into a predetermined shape. In the surface treatment step (STEP S10), the surface to be coated 18 of the foamed synthetic resin body 10 is repeatedly hardened and polished one to twelve times. The surface to be coated 18 includes the cut surface 14 resulting from the cutting step of STEP S1. In the pre-treatment step (STEP S20), the application and polish to the foamed synthetic resin body 10 is repeated one to twelve times, thus enabling the uneven surface including the beads line and the vent hole Z on the coated surface 18 to be flat or smooth. In the post-treatment step (STEP S30), synthetic resin coating including pigment is applied to the coated surface 18 resulting from the pre-treatment step (STEP S20).

In other words, the reinforcement layer 50 of the foamed synthetic resin body 10 of the embodiment described above is formed as follows. In the cutting step of STEP S1, the foamed synthetic resin body 10 composed of thermoplastic resin as the base 1 is cut into a predetermined shape. In the surface treatment step (STEP S10), the surface to be coated 18 including the cut surface 14 resulting from the cutting step of STEP S1 is hardened, thus enabling the unevenness including the beads line and the vent hole Z on the foamed synthetic resin body 10 to be obscured. Additionally, the pre-treatment step (STEP S20) enables the beads line of the coated surface to be coated 18 resulting from the surface treatment step (STEP S10) to be invisible. In the pre-treatment step (STEP S20), the synthetic resin that reduces the uneven surface including the vent hole Z is applied and the resultant harden surface is polished. Such application and polish are repeated. This enables the unevenness including the beads line of the expanded beads and the vent hole Z on the foamed synthetic resin body 10 to be further obscured. When the unevenness including the beads line of the expanded beads and the vent hole Z on the foamed synthetic resin body 10 has been obscured, the post-treatment step (STEP S30) is started. In this post-treatment step (STEP S30), the synthetic resin including pigment is applied to the surface resulting from the pre-treatment (STEP S20).

The foamed synthetic resin body 10 is formed by cutting without use of an expensive mold. This foamed synthetic resin body 10 formed by cutting is the same as the foamed synthetic resin body formed by molding. Thus, the cut body is inexpensively obtained by high-mix low-volume production. In particular, the foamed synthetic resin body 10 is easy to process. Forming the body requires only a little solid synthetic resin that is a few to a few tens of the foamed synthetic resin. This leads to energy saving and reduction of environmental load. Adjusting expansion ratio and selecting the foamed synthetic resin body 10 composed of thermoplastic resin provides the body with a desired strength and elasticity. The exterior surface has any coating and such coating is selected in accordance with use application. This provides no strange use. In the surface treatment step (STEP S10) and the pre-treatment step (STEP S20), the synthetic resin is applied. The object of this is to enable the surface to be hardened and then polished. While the application is repeated, the polish is repeated. Consequently, the coat is not thick in comparison with prior art.

Thus, the foamed synthetic resin body 10 is cut and thus forms into a particular shape without use of an expensive mold. This foamed synthetic resin body 10 is coated. Thus, the foamed synthetic resin body 10 is rich in elasticity.

The foamed synthetic resin body 10 is composed of a single or a plurality of layers that are stacked and bonded together. Thus, cutting foamed synthetic resin that is commercially available yields the foamed synthetic resin body 10 with a determined form.

The surface treatment step (STEP S10), in which the surface to be coated 18 of the base is hardened, includes the step using the heat jig 30 that heats the surface with the frictional heat resulting from the revolving of the heat jig 30. Thus, the surface of the foamed synthetic resin body 10 that is composed of thermoplastic resin is softened by the frictional heat resulting from the revolution of the heat jig 30 and then is hardened. This enables the surface to have resistance to the polish and be polish-processed into a predetermined shape. The foamed synthetic resin body 10 composed of thermoplastic resin that is used in the base 1 is heated with the heat jig 30. Thus, process control with, for example, a milling cutter, a numerical control machining, or an automatic machine tool is simplified.

The surface treatment step (STEP S10), in which the surface to be coated 18 is hardened, includes the sealing step of STEP S3 in which the synthetic resin coating is applied to prevent the soak. Applying the coating for filling in STEP S3 prevents the soak, thus enabling the surface to be polished. This yields good coated surface 18 with a uniform polish. In particular, following the step in which the surface is hardened by the frictional heat resulting from the revolving of the heat jig 30, the coating for filling is applied. This is chemical and physical effective.

The pre-treatment step (STEP S20) includes the fill-in-the-hole step of STEP S5 in which the hole is filled in synthetic resin. In this step, the hole including the vent hole Z is filled in with the synthetic resin. Thus, large depressions, chips of the expanded beads or other chips are filled in. This enables the surface to be flat easily.

The post-treatment step (STEP S30) includes the finishing step of STEP S7 in which the coating with durability is applied. This durability provides good appearance for a long period. Thus, stable coated state is kept.

The foamed synthetic resin body 10, which is formed by cutting foamed synthetic resin composed of thermoplastic resin into a particular shape, of the contact detection device of the embodiment described above has the surface to be coated 18 on the desired periphery. The surface to be coated 18 of the foamed synthetic resin body 10 with a predetermined shape is hardened by heating, by applying the synthetic resin, or both. Additionally, the surface to be coated 18 with a hard state is polished. Thus, the surface to be coated 18 of the foamed synthetic resin body 10 is coated, that is, the foamed synthetic resin body 10 has the coated surface 18.

The foamed synthetic resin body 10 of the embodiment described above is formed by forming foamed synthetic resin into a particular shape. The surface to be coated 18 of the base 1 is hardened by heating or by applying the synthetic resin and then is polished in state where the surface to be coated 18 is hardened. This flattens or smoothes the surface to be coated 18 of the foamed synthetic resin body 10.

The foamed synthetic resin body 10 is cut into a particular shape. The cut surface 14 is hardened and then the hardened cut surface 14 is polished. This polish enables the unevenness including the beads line and the vent hole Z of the foam of the foamed synthetic resin body 10 to be obscured. In particular, the application of the synthetic resin, which enables the unevenness including the beads line and the vent hole Z on the cut surface 14 to be reduced, and the polish of the synthetic resin coat are repeated. This causes the unevenness including the beads line and the vent hole Z of the foam of the foamed synthetic resin body 10 to be obscured and to be flat. When the unevenness including the beads line and the vent hole Z in the foam of the foamed synthetic resin body 10 has been obscured, applying the synthetic resin including pigment starts.

The foamed synthetic resin body 10 is formed by cutting without use of an expensive mold. This foamed synthetic resin body 10 formed by cutting is the same as foamed synthetic resin body formed by molding. Thus, the cut body is inexpensively obtained by high-mix low-volume production. In particular, the foamed synthetic resin body 10 is easily processed into a predetermined form. A little solid synthetic resin that is a few to a few tens of the foamed synthetic resin is sufficient to form the body. This leads to energy saving and reduction of environmental load. Adjusting expansion ratio and selecting the foamed synthetic resin body 10 provides the body with a desired strength and elasticity. The exterior may have any coat and such coat may be selected in accordance with use application. This eliminates strange use.

The surface to be coated 18 of the foamed synthetic resin body 10 with a predetermined shape is hardened by heating, applying the synthetic resin, or both. The object of this is to enable the surface to be hardened and thus to be polished. While the application is repeated, the polish is repeated. Thus, the coat is not thick in comparison with prior art.

The foamed synthetic resin body 10 forms into a particular shape by cutting without use of an expensive mold. This foamed synthetic resin body 10 is rich in elasticity.

The foamed synthetic resin body 10 of the embodiment described above is the foamed synthetic resin body 10 that is formed by cutting foamed synthetic resin, which is composed of thermoplastic resin as the base 1, into a particular shape. The foamed synthetic resin body 10 includes a base reinforcement layer that is formed through STEP S2 to STEP S5. The base reinforcement layer is formed as follows. The surface to be coated 18 including the cut surface 14 resulting from the cutting of the foamed synthetic resin body 10 is hardened by heating, applying synthetic resin, or both. Additionally, synthetic resin is applied to the resultant surface to reduce the uneven surface including the beads line after the surface treatment step (STEP S10) and the vent hole is filled in with synthetic resin after the surface treatment step (STEP S10).

The base reinforcement layer is the layer formed by STEP S2 to STEP S5. Thus, the surface to be coated 18 of the foamed synthetic resin body 10 is hardened by heating, applying synthetic resin, or both. Additionally, synthetic resin is applied to the resultant surface to reduce the uneven surface including the beads line in the pre-treatment (STEP S20) and the vent hole Z is filled in with the filler 42 in the pre-treatment (STEP S20).

According to the foamed synthetic resin body 10 of the embodiment described above, the surface to be coated 18, which includes the cut surface 14 that results from a cutting of the foamed synthetic resin body 10 into a particular shape, is hardened by heating, applying synthetic resin, or both. Additionally, synthetic resin is applied to the resultant surface to reduce the uneven surface including the beads line and the vent hole Z is filled up with synthetic resin.

Hardening the cut surface resulting from the cutting described above enables the unevenness including the beads line and the vent hole Z of the foam of the foamed synthetic resin body 10 to be processed so as to be inconspicuous. Additionally, applying synthetic resin, which enables the unevenness including the beads line and the vent hole Z on the cut surface 14 to be reduced, and polishing the synthetic resin that is applied are repeated. This enables the unevenness including the beads line and the vent hole Z of the foam of the foamed synthetic resin body 10 to be obscured. When the unevenness including the beads line and the vent hole Z of the foam of the foamed synthetic resin body 10 has been obscured, synthetic resin including pigment is to be applied.

The foamed synthetic resin body 10 is formed by cutting without use of an expensive mold. This foamed synthetic resin body 10 formed by cutting is similar to foamed synthetic resin body formed by molding. Thus, the cut body is inexpensively obtained by high-mix low-volume production. In particular, the foamed synthetic resin body 10 is easily processed into a predetermined form. Forming the body requires only a little solid synthetic resin that is a few to a few tens of the foamed synthetic resin. This leads to energy saving and reduction of environmental load. Adjusting the expansion ratio and selecting the foamed synthetic resin body 10 provides the body with a desired strength and elasticity. The exterior may have any coating and such coating may be selected in accordance with use application. This provides no strange use.

According to the base reinforcement layer formed by STEP S2 to STEP S5, the surface to be coated 18, which includes the cut surface 14 that results from a cutting of the foamed synthetic resin body 10, is hardened by heating, applying synthetic resin, or both. The object of this is to enable the surface to be hardened and thus polished. While applying is repeated, polishing is repeated. Thus, the coat is not thick in comparison with prior art.

The foamed synthetic resin body 10 is cut into a particular shape without use of an expensive mold. This foamed synthetic resin body 10 is rich in elasticity.

The base reinforcement layer formed by STEP S2 to STEP S5 is covered with a coat layer which is formed by applying synthetic resin to the surface of the base reinforcement layer. This enables the base reinforcement layer with a coat layer to be kept stably. As necessary, the base reinforcement layer with a coat layer has good durability and is prevented from discoloration caused by ultraviolet light. Additionally, the surface is rich in polish and elasticity. Thus, the body is steady for a long period of time.

In the surface treatment step (STEP S10) and the pre-treatment step (STEP S20) of the embodiment described above, the application and the polish of the sealer 41 used in the surface treatment step (STEP S10) are repeated as well as the application and the polish of the undercoat 43 used in the pre-treatment step (STEP S20).

Repeating the application and the polish of the sealer 41 and the undercoat 43 a number of times enables individual layer to be thin, and provides good appearance finish and good durability. If, however, the application and the polish are repeated too many times, productivity decreases. From the view of the productivity, the application and the polish are repeated preferably one time to twelve times in accordance with use application of the foamed synthetic resin body 10.

Restoring force of the foamed synthetic resin body 10 corresponds to the elasticity of the foamed synthetic resin as each layer is softly hardened in the embodiment described above. Thus, the body of the foamed synthetic resin has properties of the base. This has been verified by the inventors.

As the foamed synthetic resin body 10, polyurethane (PUR), polystyrene (PS), polyolefin (mainly polyethylene (PE) or polypropylene (PP)), or foamed resin such as phenol resin (PF), polyvinyl chloride (PVC), urea resin (UF), silicone (SI), polyimide (PI), or melamine resin (MF) is employed.

In the surface treatment step (STEP S10), in which the coated surface 18 including the cut surface resulting from the cutting step is hardened and polished, a layer of synthetic resin has a thickness of 50 to 200 μm. The synthetic resin is not limited to the sealer 41 used in the example described above. Synthetic resin that hardens the coated surface 18 to enable the surface to be polished can serve as the sealer 41.

In the pre-treatment step (STEP S20), in which synthetic resin is applied to flatten the uneven surface including the beads line and the vent hole Z, the layer of the synthetic resin has a thickness of 200 to 400 μm. The synthetic resin is not limited to the filler 42 and the undercoat 43 used in the example described above. Synthetic resin that can be applied and polished to flatten the uneven surface including the beads line and the vent hole Z can serve as the filler 42 and the undercoat 43.

In the post-treatment step (STEP S30), in which synthetic resin including pigment is applied to the coated surface 18 resulting from the pre-treatment step (STEP S20), the layer of the topcoat 44 that is applied has a thickness of 300 to 600 μm and the layer of the finishing coating 45 that is applied has a thickness of 50 to 400 μm. The synthetic resin is not limited to such topcoat 44 and finishing coating 45. Any synthetic resin may be used, so long as it includes pigment and can be applied to the coated surface 18 resulting from the pre-treatment step (STEP S20). The coating may be transparent or not.

The reinforcement layer 50 of the present embodiment does not required the all coating of the sealer 41, the filler 42, the undercoat 43, the topcoat 44 and the finishing coating 45 to be applied. Any one or more of the sealer 41, the filler 42, the undercoat 43, the topcoat 44 and the finishing coating 45 may be omitted, when a closed-cell foam, which has no joined inside bubbles, is thick, for instance. A mold to form the foamed synthetic resin body 10 may be prepared and the foamed synthetic resin body 10 that covers base 1 may include a skin layer formed by using the mold. This foamed synthetic resin body 10 is formed by forming foamed synthetic resin, which is composed of a single or a plurality of layers that are stacked and bonded together, into a particular shape. For instance, the foamed synthetic resin body 10, which is formed by forming foamed synthetic resin composed of a single or a plurality of layers that are stacked and bonded together into a particular shape and covers the base 1, may be formed by using a mold that is prepared to form the foamed synthetic resin body 10. Such foamed synthetic resin body 10 may include a skin layer formed by using the mold.

In the embodiment described above, when the air in the volume space 4 is compressed by the external pressure, a part of the compressed air is required to fail to escape out of the volume space 4. Thus, two-dimensional surface structure may be employed. Alternatively, three-dimensional structure may be employed. Preferably, the reinforcement layer 50 has three-dimensions. Such reinforcement layer 50 with three-dimensions enables the volume space 4 in addition to the reinforcement layer 50 to have high strength and high density.

The contact detection device of the embodiment described above has the base 1 with a predetermined shape, and the foamed synthetic resin body 10 that covers the base 1. The foamed synthetic resin body 10 is composed of foamed synthetic resin that forms into a predetermined shape. The foamed synthetic resin is composed of a single or a plurality of layers that are laminated. The contact detection device of the embodiment described above includes the predetermined volume space 4 between the base 1 and the foamed synthetic resin 10, which are opposed each other. This volume space 4 is on the base 1, the foamed synthetic resin 10, or both. The contact detection device of the embodiment described above further has the reinforced layer 50 that is on the inside, which is the volume space 4 side, to prevent the compressed air in the volume space 4 from leaking through the base 1 and the foamed synthetic resin body 10. The contact detection device of the embodiment described above further has the flow sensor 70 that detects the flow rate (liter/second) of the air flowing from the volume space 4 to outside air.

This contact detection device of the embodiment includes the volume space 4 that is between the base 1 with a particular shape and the foamed synthetic resin body 10, which covers the base 1 and is composed of formed synthetic resin that forms into a particular shape. The volume space 4, in which the air fails to leak through the basel and the foamed synthetic resin body 10, is on either or both of the base 1 and the foamed synthetic resin 10. The contact detection device further includes the flow sensor 70 that detects the flow rate (liter/second) of the air that flows from the volume space 4 to the outside. The output signal of the flow sensor 70 is amplified through a signal amplify.

The reinforcement layer 50 prevents the compressed air in the volume space 4 from leaking through the basel and the foamed synthetic resin body 10 to open air. Thus, the reinforcement layer 50 defines the volume space 4.

The volume space 4, in which the air fails to leak through the basel and the foamed synthetic resin body 10 to open air, is on either or both of the base 1 and the foamed synthetic resin 10. The output signal of the flow sensor 70 is used to determine the flow rate (liter/second) of the air that flows from the volume space 4 to open air. This is used to determine that the volume in the volume space 4 varies and something including a human body has come into contact with the basel, the foamed synthetic resin body 10 or both, when the external force is applied to the basel or the foamed synthetic resin body 10.

The base 1 with a particular shape is composed of foamed synthetic resin that is a single or a plurality of layers that are laminated.

Thus, the base 1 and the foamed synthetic resin body 10 have the same properties in materials. That is, the base 1 and foamed synthetic resin body 10, which are opposite each other, have the same materials. This provides weight saving and easy process.

The reinforcement layer 50 reduces the unevenness including the beads line and the vent hole on the cut surface, which results from the cutting of the single foamed synthetic resin or the laminated foamed synthetic resin (11, 12, 13). Leak of the air from the volume space 4 to open air is prevented by the reinforcement layer 50 in any embodiments of the present invention. This is achieved by reinforcing the interior surface forming the reinforcement layer 50 uniformly and densely. Three-dimensional structure forming the reinforcement layer 50 in addition to the interior surface forming the reinforcement layer 50 has high density in the present embodiment, thus enabling the air to be prevented from leaking to open air.

In particular, the foamed synthetic resin body 10 has the reinforcement layer 50 that increases the unevenness including the beads line and the vent hole, and the cut surface, which results from the cutting of the foamed synthetic resin 10. Forming the reinforcement layer 50 on the surface of the foamed synthetic resin mold or the surface of the processed foamed synthetic resin plate prevents the air from leaking through the foamed synthetic resin body 10 to open air.

The volume space 4 contains the elastomeric member that is composed of foamed synthetic resin plate with air permeability. The elastomeric member has punched holes that are formed by punching holes at once or one by one in the foamed synthetic resin plate and thus forms into the grid shape, the quadrilateral shape, the fine shark skin pattern, polka dots, or checks.

Thus, the volume space 4 contains the foamed synthetic resin plate with air permeability and elasticity. The foamed synthetic resin plate has punched holes that are formed by punching holes at once or a hole individually and alternately, and thus forms into the grid shape, the quadrilateral shape, the fine shark skin pattern, the polka dots, or the checks. This enables the volume space 4 to be not empty but have elasticity for keeping itself and other characteristics. Thus, the contact detection device including the volume space 4 with complex three-dimensions detects contact as well as the contact detection device including the volume space 4 with two-dimensions through the variation in the volume of the volume space 4.

The flow sensor 70 includes two flow sensors in pairs, in which one flow sensor is connected to the other flow sensor in series through their air passages 76 that guides the air from the inlet 75 to the outlet 77. Thus, the output of the flow sensor 70 is logical disjunction output that is sum of the signal output of two flow sensors.

The flow sensor 70 includes two flow sensors in which the one flow sensor is connected to the other flow sensor in series through their air passages from the inlet to the outlet. Thus, the output of the flow sensor 70 is logical disjunction output that is sum of signal output of two flow sensors. This enables detection with high reliability.

The flow sensor 70 defines the auxiliary space 80 in which the air, which has passed through the air passage from the inlet to the outlet of the flow sensor 70, is dispersed and discharged.

The flow sensor 70 defines the auxiliary space 80 in which the air, which has passed through the flow sensor 70 from the inlet to the outlet, is dispersed and discharged. Thus, the air that has passed through the flow sensor 70 from the inlet to the outlet is dispersed in the auxiliary space 80 and discharged from the auxiliary space 80. Alternatively, the auxiliary space 80 contains the air temporarily. When the air is absorbed or discharged, no part air flow creates. The air is discharged or absorbed through the auxiliary space 80. Thus, no part dirty creates when the contact detection device will have so many detections.

In particular, the volume space 4, the auxiliary space 80, and atmosphere in that order vary in the pressure, external force. This enables the flow sensor 70 to have high responsiveness. Additionally, the contact detection device includes the auxiliary space 80 in which the air, which has passed through the flow sensor 70 from the inlet to the outlet, is dispersed and discharged. The auxiliary space 80 contains the compressed air temporarily. Thus, when the air is absorbed or discharged, no part air flow creates. The air is discharged or absorbed through the auxiliary space 80. Thus, no part dirty creates when the contact detection device will have so many detections.

The flow sensor 70 includes two flow sensors in which one of the flow sensors following the guide passage 5 is connected to the other of flow sensors in series from the inlet to the outlet. The output of the flow sensor 70 is logical disjunction output that is sum of signal output of two flow sensors. This enables detection with high reliability.

In particular, the flow sensor 70 including two flow sensors has common input. Thus, the output of the flow sensor 70 is logical disjunction output that is sum of signal output of two flow sensors. This increases signal reliability and enables the flow sensor 70 to be calibrated accurately by using individual flow sensor output.

To even the uneven surface on the coated surface 18, which includes the cut surface 14 resulting from the cutting step of STEP S1, of the base 1, the foamed synthetic resin that includes organic or inorganic based spheres may be applied in the pre-treatment step (STEP S20). The spheres are dispersed uniformly in the foamed synthetic resin. Each sphere is, for example, 300 or less μm in median diameter, which is determined by a laser diffraction scattering method using a laser diffraction particle size analyzer. Additionally, the foamed synthetic resin including pigment may be applied to the coated surface 18 resulting from the pre-treatment step.

The spheres sandwich the beads line. Alternatively or additionally, the spheres are inserted into foamed holes, thus enabling the resin to spread on the border. Alternatively or additionally, the spheres fill in the uneven surface to connect the surface and the spheres with resin. Thus, the beads line, foamed holes and unevenness is invisible as a whole. When the beads line, foamed holes and unevenness in foam composed of foamed synthetic resin have been invisible, the foamed synthetic resin including pigment may be applied to the surface resulting from the pre-treatment step in the post-treatment step.

The contact detection device of the embodiment described above includes the base 1 with a particular shape, the foamed synthetic resin body 10 that covers the base 1 and is composed of foamed synthetic resin that forms into a particular shape, the volume space 4 that is between the foamed synthetic resin body 10 and the foamed synthetic resin body 10 and is on either or both of the foamed synthetic resin body 10 and the foamed synthetic resin body 10, and the reinforcement layer 50 that prevents the air in the volume space 4 from leaking through the base 1 and/or the foamed synthetic resin body 10 to open air. This contact detection device obtains the output signal of the flow sensor 70 that detects air flow from the volume space 4 to open air.

According to the present embodiment, the air in the volume space 4 is lead to the closed auxiliary space 80. Thus, the contact detection device of the embodiment eliminates the need for the air going in or out. Consequently, the contact detection device of the embodiment is easy to use.

REFERENCE SIGNS LIST 1 base
4 volume space
4A, 4B, or 4C space holder
5 guide passage
6 inner flame
6A inner flame foamed synthetic resin
10 foamed synthetic resin body
11, 12, or 13 foamed synthetic resin
14 cut surface
18 surface to be coated
20 ball end mill
30 heating jig
41 sealer
43 undercoat
44 topcoat
45 finishing coating
50 reinforcement layer
70 flow sensor
80 auxiliary place

The invention claimed is:

1. A contact detection device, comprising:
 a base;
 a foamed synthetic resin body covering the base, the foamed synthetic resin body comprising a piece of foamed synthetic resin or a plurality of pieces of foamed synthetic resin being stacked and bonded together, wherein an exterior surface of the base faces an interior surface of the foamed synthetic resin body with a volume space therebetween;
 a reinforced layer formed on the interior surface of the foamed synthetic resin body to prevent air in the volume space from leaking through one or more of the exterior surface of the base and the interior surface of the foamed synthetic resin body to open air; and
 at least one flow sensor positioned at an opening on an interior surface of the base, the at least one flow sensor being configured to detect a flow rate (liter/second) of the air passing through the at least one flow sensor at the opening from the volume space to the open air;
 wherein the volume space is entirely enclosed by the base, the foamed synthetic resin body, and the at least one flow sensor,
 wherein contact with an exterior of the foamed synthetic resin body compresses the air in the volume space such that the air in the volume space flows through the opening, and
 wherein the contact is detected based on the detected flow rate.

2. A contact detection device according to claim 1, wherein the base comprises a piece of the foamed synthetic resin or a plurality of pieces of the foamed synthetic resin being stacked and bonded together.

3. A contact detection device as in claim 1, wherein the reinforced layer reduces unevenness including a beads line and a vent hole on a cut surface and increases density on the cut surface, the cut surface resulting from a cutting of a piece of the foamed synthetic resin or a plurality of pieces of the foamed synthetic resin being stacked and bonded together.

4. A contact detection device as in claim 1, wherein the volume space contains a space holder comprising an elastomeric member, the elastomeric member comprising foamed synthetic resin including open cells and thus having ventilation, the elastomeric member having punched holes formed by punching holes at once or one by one in the foamed synthetic resin and thus having a grid shape, a quadrilateral shape, a fine shark skin, polka dots, or checks.

5. A contact detection device as in claim 1, wherein the at least one flow sensor defines an auxiliary space to disperse and discharge air passing through an air passage of the at least one flow sensor, the air passage guiding the air from an inlet of the at least one flow sensor to an outlet of the at least one flow sensor.

6. A contact detection device as in claim 1, wherein the at least one flow sensor comprises two flow sensors in pairs and outputs logical disjunction of signal output of the two flow sensors, the two flow sensors connected in series through an air passage from an inlet of the two flow sensors to an outlet of the two flow sensors.

* * * * *